(12) United States Patent
Ito

(10) Patent No.: US 8,693,060 B2
(45) Date of Patent: Apr. 8, 2014

(54) IMAGE READING DEVICE AND IMAGE FORMING APPARATUS

(75) Inventor: Masao Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1079 days.

(21) Appl. No.: 12/609,211

(22) Filed: Oct. 30, 2009

(65) Prior Publication Data

US 2010/0290093 A1 Nov. 18, 2010

(30) Foreign Application Priority Data

May 12, 2009 (JP) ................................ 2009-115714

(51) Int. Cl.
*H04N 1/60* (2006.01)
*H04N 1/409* (2006.01)
*H04N 1/38* (2006.01)
*H04N 1/58* (2006.01)
*G03G 15/00* (2006.01)

(52) U.S. Cl.
CPC ............. *H04N 1/409* (2013.01); *H04N 1/4097* (2013.01); *H04N 1/58* (2013.01); *G03G 15/5058* (2013.01)
USPC .......... 358/3.26; 358/1.9; 358/1.14; 358/504; 358/518; 358/463; 358/474

(58) Field of Classification Search
CPC ............ H04N 2201/0456; H04N 2201/04749; H04N 2201/04751; H04N 1/1043; H04N 1/1048; H04N 1/409; H04N 1/4097; G02B 3/02; G02B 3/10; G02B 3/12; G02B 3/0006; G02B 3/0081; G02B 3/0087; G03G 15/5033; G03G 15/5037; G03G 15/5041; G03G 15/5054
See application file for complete search history.

(56) References Cited

U.S. PATENT DOCUMENTS

| | | | | |
|---|---|---|---|---|
| 5,168,310 A * | 12/1992 | Hayashi et al. | ............... | 399/215 |
| 5,734,483 A * | 3/1998 | Itoh | ............... | 358/496 |
| 5,768,023 A * | 6/1998 | Sawaki et al. | ............... | 359/622 |
| 6,456,314 B1 * | 9/2002 | Masuda | ............... | 347/244 |
| 6,765,696 B1 * | 7/2004 | Motominami et al. | ........ | 358/471 |
| 7,193,642 B2 * | 3/2007 | Hirai et al. | .................... | 347/236 |
| 7,965,318 B2 * | 6/2011 | Huang | ........................ | 348/208.7 |
| 2004/0227981 A1 * | 11/2004 | Nishikawa et al. | ........... | 358/496 |

FOREIGN PATENT DOCUMENTS

| | | |
|---|---|---|
| JP | 05-068168 | 3/1993 |
| JP | 08-009157 | 1/1996 |
| JP | 09-163130 | 6/1997 |
| JP | 10-279122 | 10/1998 |

(Continued)

OTHER PUBLICATIONS

English translation of Office Action dated Jun. 4, 2013 in JP 2009-115714.
English language abstract and machine translation of JP 2002-314753.

(Continued)

*Primary Examiner* — Richard Zhu
(74) *Attorney, Agent, or Firm* — Fildes & Outland, P.C.

(57) ABSTRACT

The image reading device includes: a reading unit that includes a light source emitting light to irradiate an image on a recording medium transported in a first direction and a light receiving portion that receives light reflected by the recording medium; a transport path forming unit that forms a part of a transport path for the recording medium; a light transmitting portion that is provided in the transport path forming unit and transmits the light; and plural projection members that are provided to the light transmitting portion so as to project from the light transmitting portion toward the transport path, and that are arranged in a second direction crossing the first direction while each extending in the first direction.

9 Claims, 21 Drawing Sheets

(56) References Cited

FOREIGN PATENT DOCUMENTS

| | | |
|---|---|---|
| JP | 2001-083748 | 3/2001 |
| JP | 2002-314753 | 10/2002 |
| JP | 2002-368963 | 12/2002 |
| JP | 2003-032406 | 1/2003 |
| JP | 2007-116590 | 5/2007 |
| JP | 2009-038530 | 2/2009 |

OTHER PUBLICATIONS

English language abstract and machine translation of JP 10-279122.
English language abstract and machine translation of JP 2009-038530.
English translation of Office Action dated Jan. 21, 2014 in JP 2009-115714.
English Language Abstract and Machine translation of JP 2003-032406.

* cited by examiner

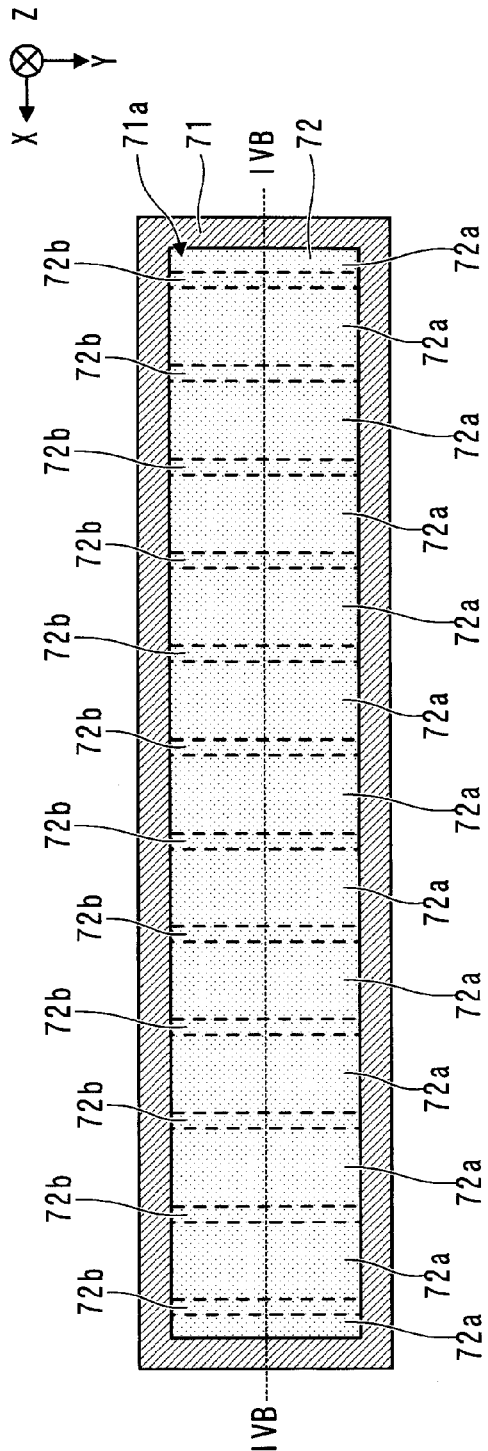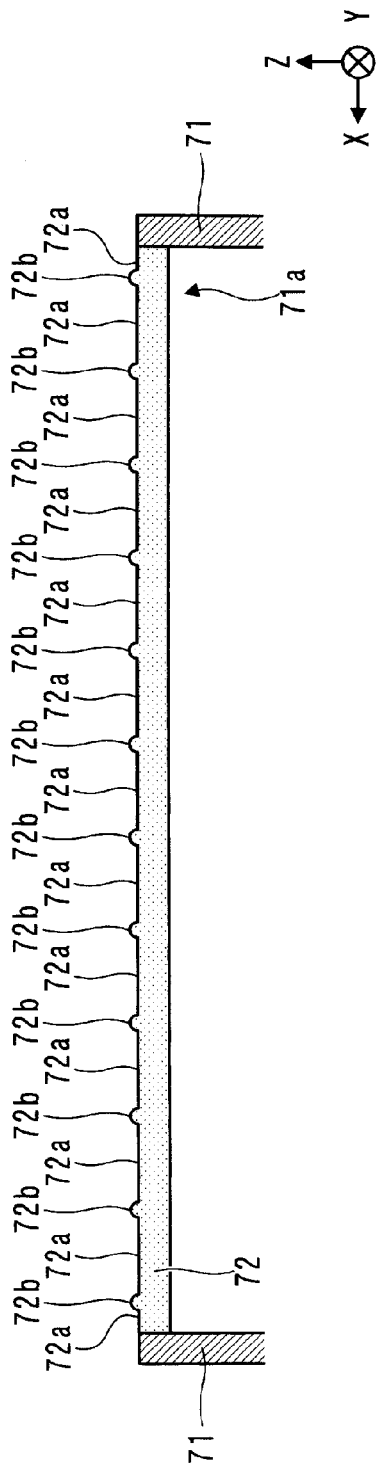

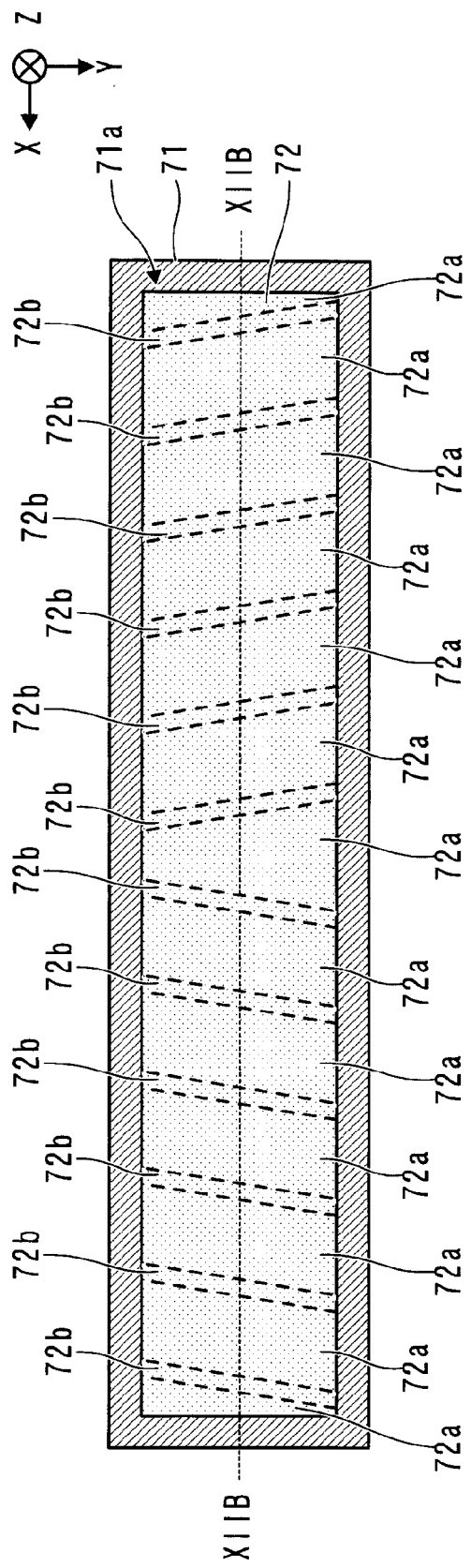
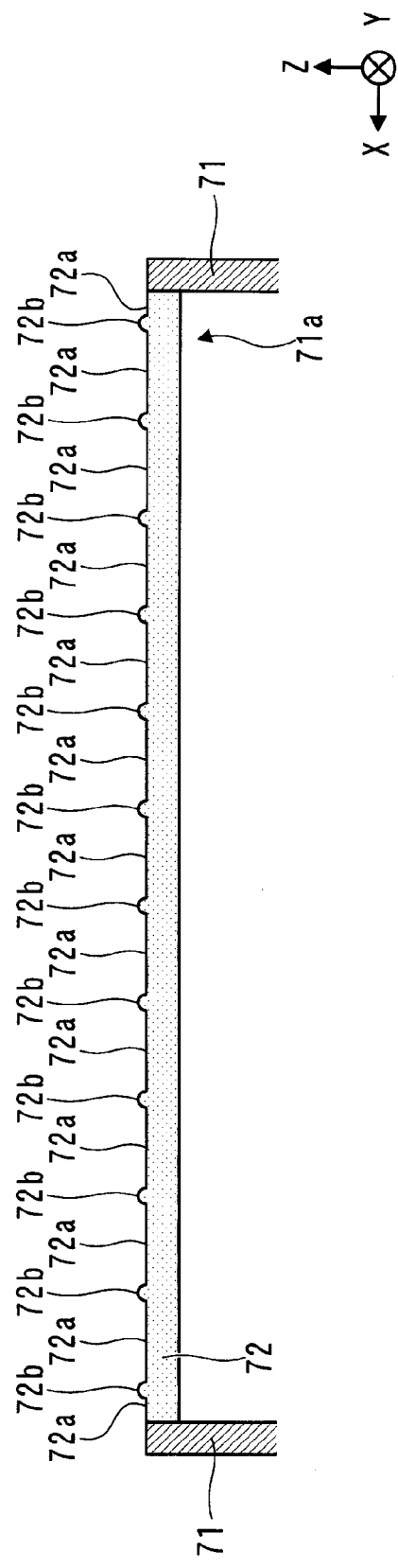

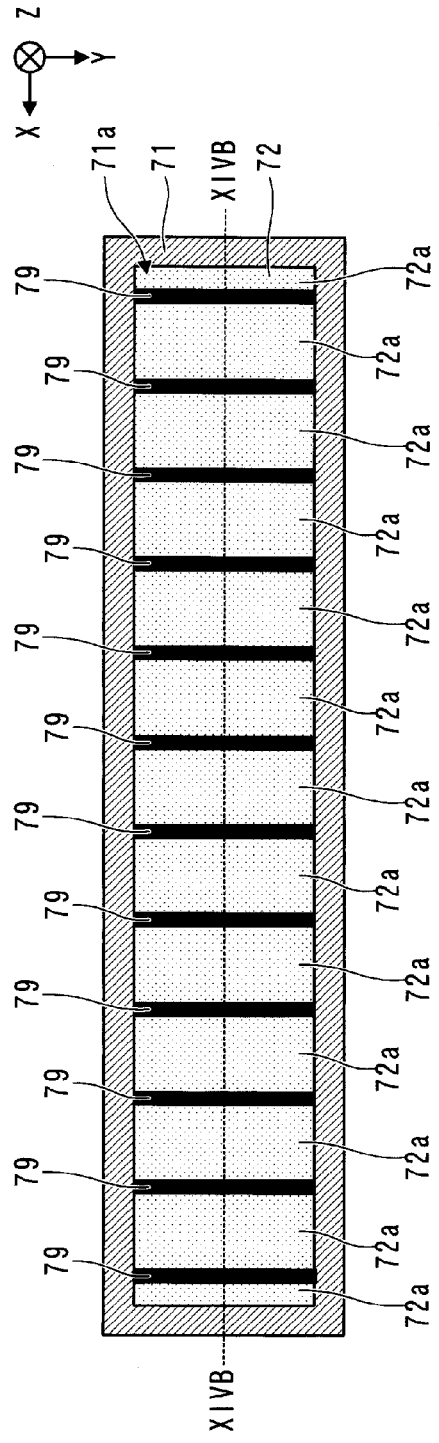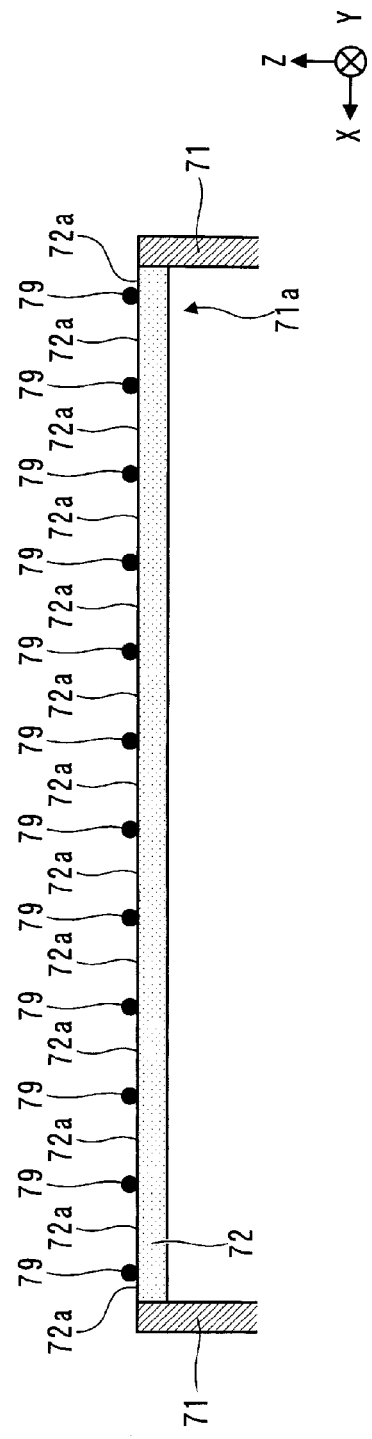

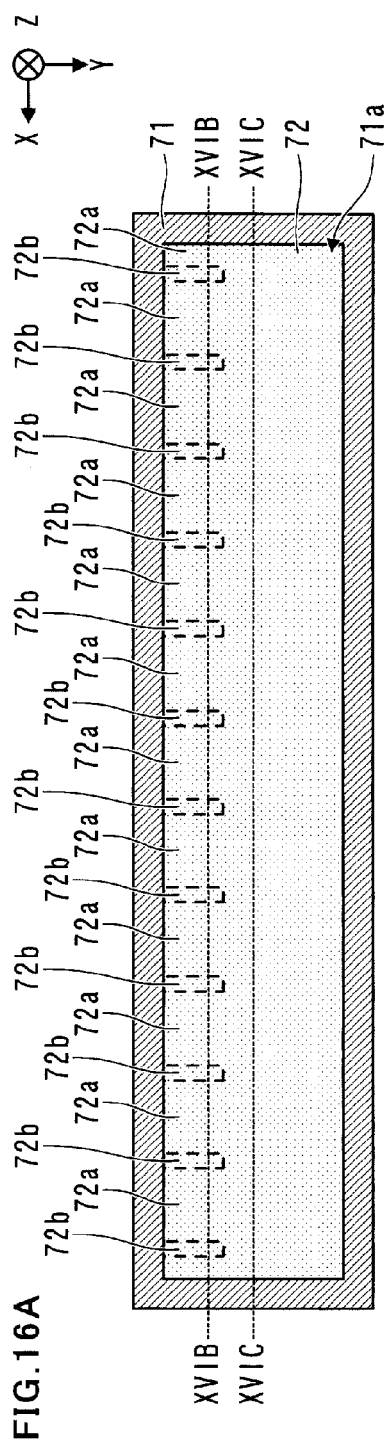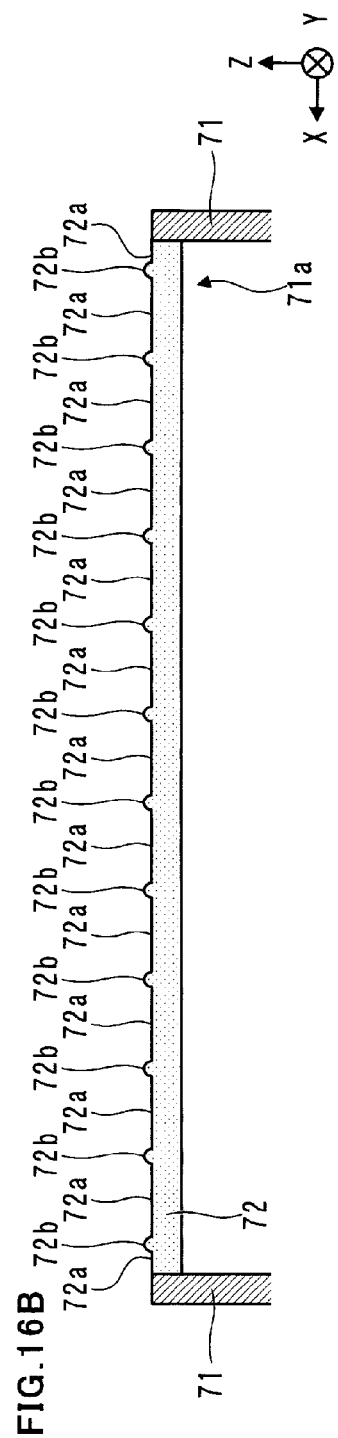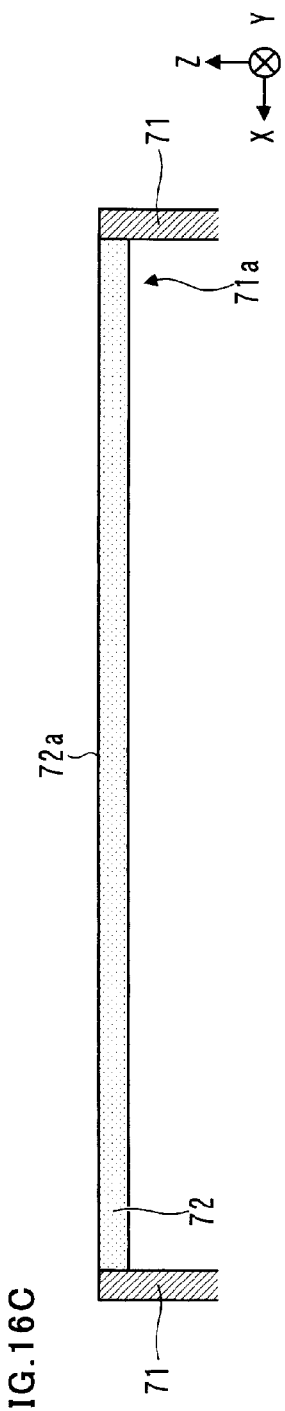

IMAGE READING DEVICE AND IMAGE FORMING APPARATUS

CROSS REFERENCE TO RELATED APPLICATIONS

This application is based on and claims priority under 35 USC §119 from Japanese Patent Application No. 2009-115714 filed May 12, 2009.

BACKGROUND

1. Technical Field

The present invention relates to an image reading device that reads an image formed on a recording medium and an image forming apparatus that forms an image on a recording medium.

2. Related Art

There is known an image reading device for input to a copy machine, a facsimile, and a computer, in which an image recorded on a recording medium is read by a light receiving portion such as a CCD image sensor or the like while the recording medium is transported.

SUMMARY

According to an aspect of the present invention, there is provided an image reading device including: a reading unit that includes a light source emitting light to irradiate an image on a recording medium transported in a first direction and a light receiving portion that receives light reflected by the recording medium; a transport path forming unit that forms a part of a transport path for the recording medium; a light transmitting portion that is provided in the transport path forming unit and transmits the light; and plural projection members that are provided to the light transmitting portion so as to project from the light transmitting portion toward the transport path, and that are arranged in a second direction crossing the first direction while each extending in the first direction.

BRIEF DESCRIPTION OF THE DRAWINGS

Exemplary embodiment(s) of the present invention will be described in detail based on the following figures, wherein:

FIGS. 4A and 4B are views for explaining a configuration of the light transmitting member in the first exemplary embodiment;

FIGS. 12A and 12B are views for explaining another configuration of the light transmitting member;

FIGS. 14A and 14B are views for explaining still another configuration of the light transmitting member;

FIGS. 16A to 16C are views for explaining a configuration of the light transmitting member in the second exemplary embodiment;

DETAILED DESCRIPTION

First Exemplary Embodiment

Figure 1:
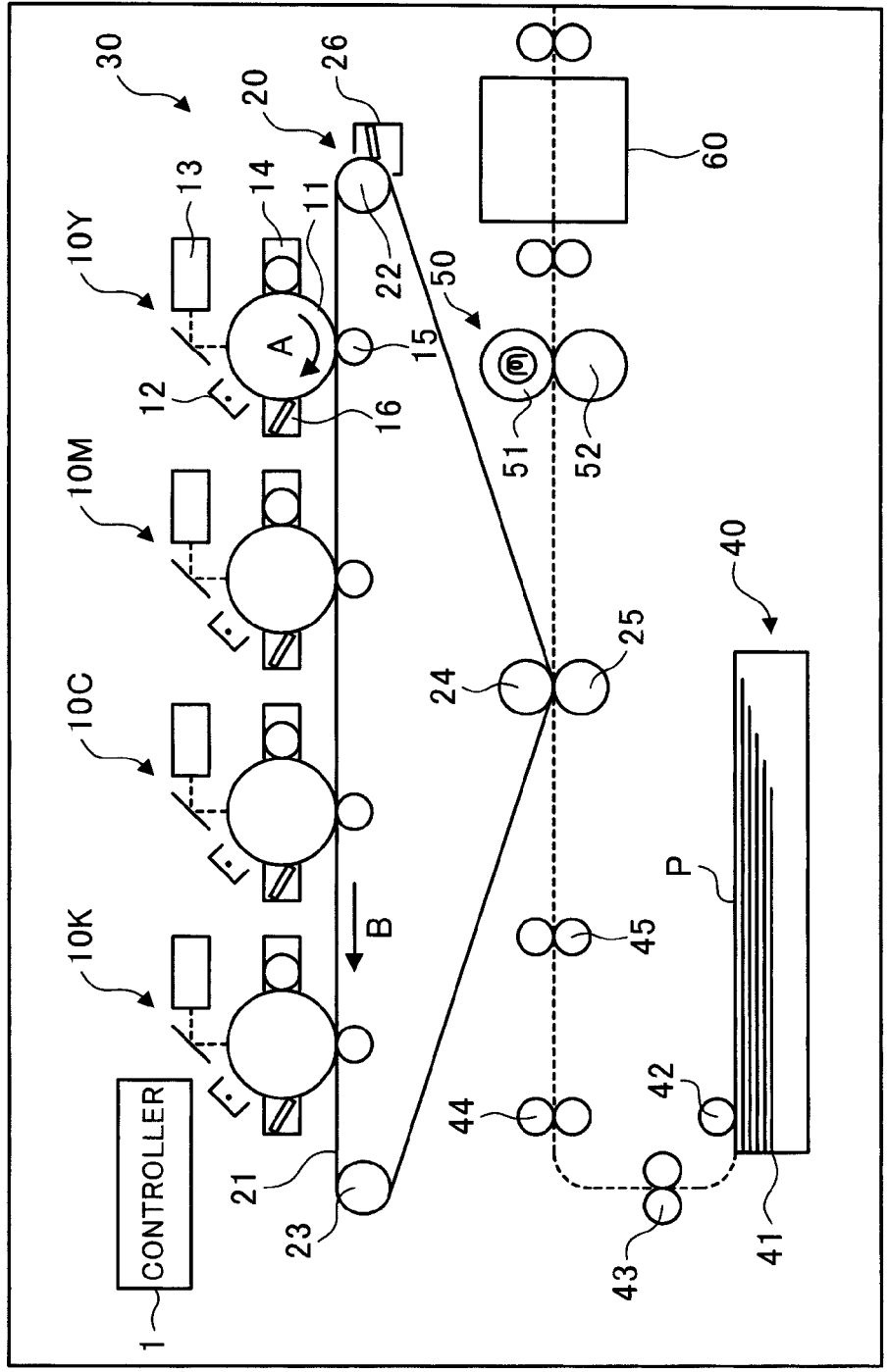
FIG. 1 is a view showing a configuration of an image forming apparatus to which the first exemplary embodiment is applied.

FIG. 1 is a view showing a configuration of an image forming apparatus to which the first exemplary embodiment is applied. The image forming apparatus includes multiple image formation units 10, a transfer unit 20, a paper feeder 40, a fixing unit 50 and an image reader 60. Note that, in the following description, the multiple image formation units 10 and the transfer unit 20 are collectively called an image formation section 30. Moreover, the image forming apparatus further includes a controller 1 that controls operations of the image formation section 30, the feeder 40, the fixing unit 50 and the image reader 60. In the first exemplary embodiment, an image forming unit is constituted by the image formation section 30 and the fixing unit 50.

The multiple image formation units 10 include: a yellow unit 10Y that forms a yellow image; a magenta unit 10M that forms a magenta image; a cyan unit 10C that forms a cyan image; and a black unit 10K that forms a black image. Each of the yellow unit 10Y, the magenta unit 10M, the cyan unit 10C and the black unit 10K forms a toner image, that is, an image of a corresponding one of color components used in electrophotography.

The image formation units 10Y, 10M, 10C and 10K have the same configuration except for the toner color used in each unit. Accordingly, a description is given here by taking the yellow unit 10Y as an example. The yellow unit 10Y includes a photoconductive drum 11, a charging device 12, an exposure device 13, a developing device 14, a primary transfer roll 15 and a photoconductive cleaner 16. The photoconductive drum 11 includes a photoconductive layer not shown in the figure and rotates in an arrow direction A in FIG. 1. The charging device 12 charges the photoconductive layer of the photoconductive drum 11. The exposure device 13 exposes the photoconductive layer of the photoconductive drum 11 thus charged, to form an electrostatic image. The developing device 14 stores a toner of a corresponding color component (a yellow toner in the case of the yellow unit 10Y), and develops, with the toner, the electrostatic image formed on the photoconductive drum 11. The primary transfer roll 15 primarily transfers the toner image formed on the photoconductive drum 11 onto an intermediate transfer belt 21 to be described later. The photoconductive cleaner 16 removes residual toner particles and the like remaining on the photoconductive drum 11 after the primary transfer.

The transfer unit 20 includes the intermediate transfer belt 21, a secondary transfer roll 25 and an intermediate transfer cleaner 26. The intermediate transfer belt 21 is hanged by a driving roll 22, a hanging roll 23 and a backup roll 24, and rotates in an arrow direction B. The secondary transfer roll 25 is arranged so as to face the backup roll 24 with the intermediate transfer belt 21 interposed therebetween. The intermediate transfer cleaner 26 removes residual toner particles and the like remaining on the intermediate transfer belt 21 after the secondary transfer. Here, the backup roll 24 and the secondary transfer roll 25 function as a secondary transfer unit that secondarily transfers, onto a sheet P to be described later, the toner image primarily transferred onto the intermediate transfer belt 21.

The paper feeder 40 includes a sheet container 41, a feed roll 42, separation rolls 43, upstream transport rolls 44 and downstream transport rolls 45. The sheet container 41 contains sheets P as an example of recording media. The feed roll 42 sends out sheets P from the bundle of sheets P contained in the sheet container 41. The separation rolls 43 separate, from one another, the sheets P sent out by the feed roll 42, and transport the separated sheet P. The upstream transport rolls 44 further transport the sheet P transported through the separating rolls 43, to the downstream side, and perform loop formation on the sheet P in cooperation with the downstream transport rolls 45. The downstream transport rolls 45 feed the sheet P to the secondary transfer unit in such a manner that the downstream transport rolls 45 stops to suspend transportation of the sheet P and starts to rotate again at suitable timing.

The fixing unit 50 that is disposed downstream of the secondary transfer unit in a transport direction of the sheet P includes: a heating roll 51 that includes therein a heat source; and a pressure roll 52 that is in contact with the heating roll 51. The fixing unit 50 fixes the toner image transferred onto the sheet P with heat and pressure.

The image reader 60 as an example of an image reading device is disposed downstream of the fixing unit 50 in the transport direction of the sheet P. The image reader 60 has a function to read one side of the sheet P outputted from the fixing unit 50 and then transported to the image reader 60, to be more specific, the side, on which the toner image is formed, of the sheet P.

Figure 2:
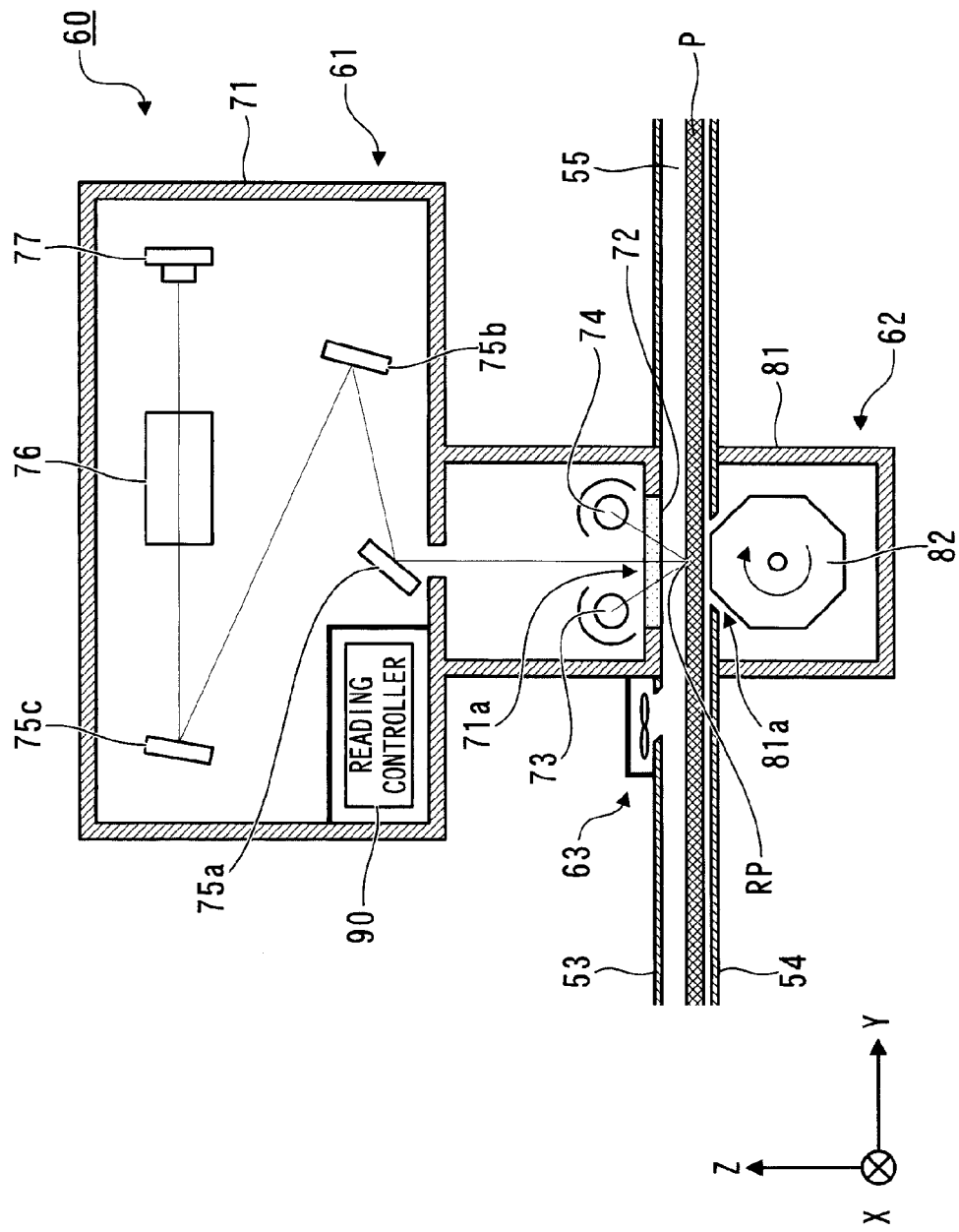
FIG. 2 is a view for explaining a configuration of the image reader.

FIG. 2 is a view for explaining a configuration of the above-described image reader 60. Here, FIG. 2 shows a cross-sectional configuration of the image reader 60 in FIG. 1 seen from the front side. Note that, in the following description, the transport direction of the sheet P is called a second scan direction Y, and a direction orthogonal to the transport direction of the sheet P is called a first scan direction X. Here, the second scan direction Y and the first scan direction X correspond to a first direction and a second direction, respectively. Moreover, a direction perpendicular to a surface of the transported sheet P, that is, a moving direction of reflected light in reading by the image reader 60, is called an optical axis direction Z.

Here, downstream of the fixing unit 50 shown in FIG. 1, a first guide 53 and a second guide 54 that guide the sheet P being transported are formed. Accordingly, the sheet P is transported in a sheet transport path 55 formed between the first guide 53 (and a part of a first housing 71 to be described later) and the second guide 54.

The image reader 60 includes an image capturing portion 61, a facing portion 62 and an air blower 63 as an example of an air blowing unit. The image capturing portion 61 is arranged above the first guide 53, that is, on a side facing an image formation surface of the sheet P being transported, and captures an image of the sheet P. The facing portion 62 is arranged under the second guide 54 so as to face the image capturing portion 61. The air blower 63 is arranged above the first guide 53 and upstream of the image capturing portion 61 in the sheet transport direction, and includes a fan that sends air to the sheet transport path 55.

Among these, the image capturing portion 61 as an example of a reading unit includes: the first housing 71 that has a space formed therein and an opening 71a formed at a bottom part facing the sheet transport path 55; and a light transmitting member 72 that transmits visible light and that is fitted into the opening 71a. A part of the first housing 71 functions as a transport path forming unit that forms a part of the sheet transport path 55 together with the first guide 53. Moreover, the image capturing portion 61 includes: a first light source 73 that is arranged above the light transmitting member 72 and at a lower part in the first housing 71 and that emits light toward the sheet transport path 55 through the light transmitting member 72; and a second light source 74 that is arranged at a position downstream of the first light source 73 in the transport direction of the sheet P and similarly emits light toward the sheet transport path 55 through the light transmitting member 72. In the first exemplary embodiment, the first light source 73 and the second light source 74 function as an example of a light source. Furthermore, the image capturing portion 61 includes: a first mirror 75a, a second mirror 75b and a third mirror 75c that further reflect light beams which are emitted by the first light source 73 and the second light source 74 to irradiate, through the light transmitting member 72, the sheet P being transported in the sheet transport path 55 and are then reflected in the optical axis direction Z at a reading position RP at which the sheet P is read; a lens system 76 that reduces the size of an optical image entering the lens system 76 from the third mirror 75c; and a charge coupled device (CCD) image sensor 77 as an example of a light receiving portion that receives an outgoing light from the lens system 76 and performs photoelectric conversion. In short, in the first exemplary embodiment, the image reader 60 forms an optical image on the CCD image sensor 77 by using a so-called optical reduction system. Note that, although shown as a single lens in FIG. 2, the lens system 76 may be configured by a combination of multiple lenses.

Meanwhile, the facing portion 62 has a space formed therein, and includes a second housing 81 and a reading reference member 82. The second housing 81 has an opening 81a formed at an upper part facing the sheet transport path 55. The reading reference member 82 is rotatably arranged inside the second housing 81, and is read by the image capturing portion 61 and thereby used for calibration of the image capturing portion 61. Here, the reading reference member 82 has an octagonal cross section, and is arranged so that one of the outer surfaces would be exposed at the opening 81a. In other words, the reading reference member 82 is arranged so that each of the outer surfaces thereof may be positioned at the position RP at which reading by the image capturing portion 61 is performed. In the outer surfaces of the reading reference member 82, formed are, for example: a white reference surface including a white reference member formed thereon; a black reference surface including a black reference member formed thereon; a Y reference surface including a yellow reference member formed thereon; an M reference surface including a magenta reference member formed thereon; a C reference surface including a cyan reference member formed thereon; an exposed surface in reading that is exposed when the sheet P is read; and the like. The white reference surface, the black reference surface, the Y reference surface, the M reference surface, the C reference surface, the exposed surface in reading and the like are each formed in a larger area than an image capturing area for the image capturing portion 61, in the first scan direction X and the second scan direction Y.

Moreover, the image capturing portion 61 is provided with a reading controller 90 that controls operations of the image capturing portion 61, the facing portion 62, and the air blower 63, which form the image reader 60. The reading controller 90 controls the operations in accordance with an instruction from the controller 1 of the image forming apparatus shown in FIG. 1.

Figure 3:
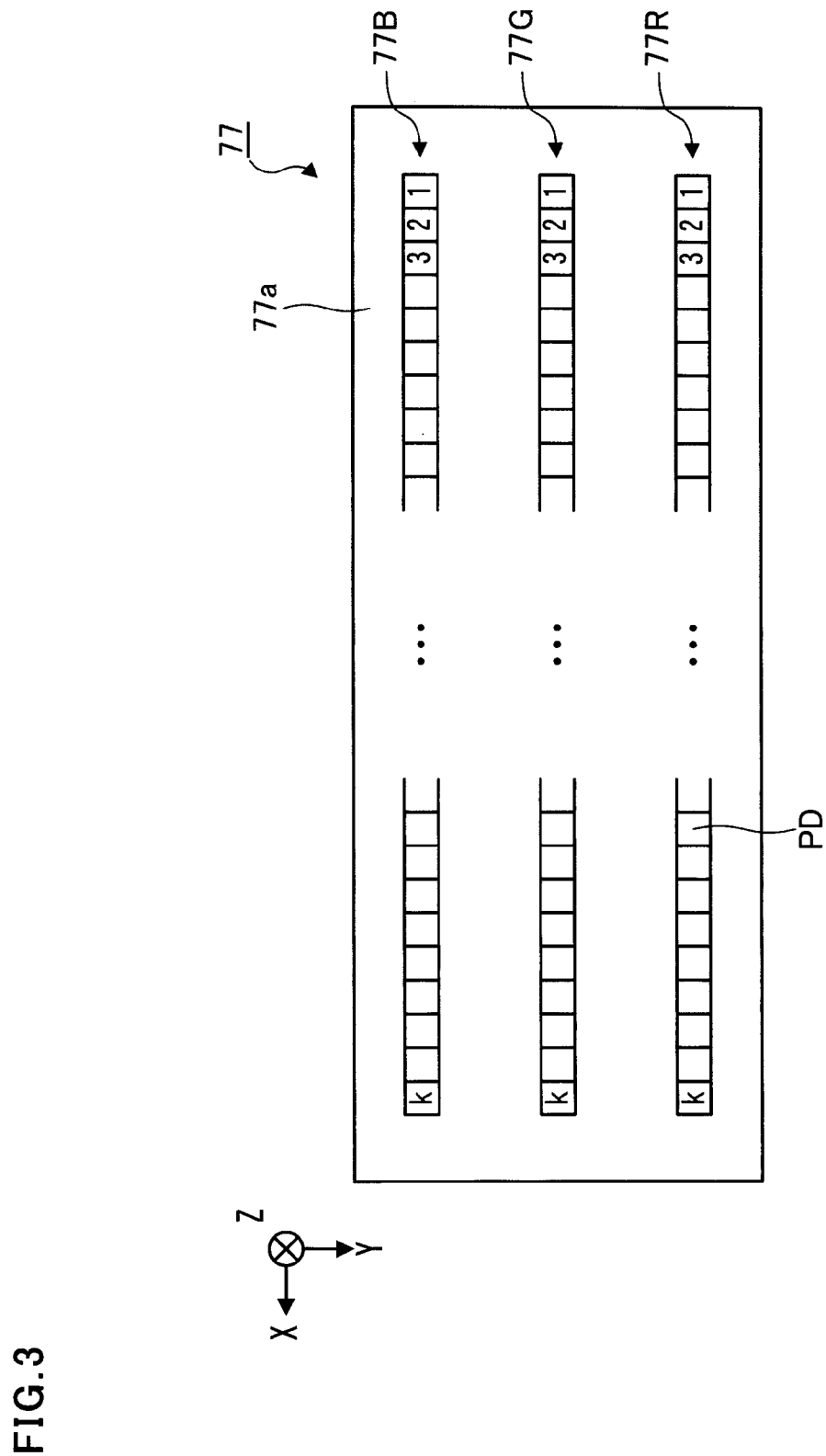
FIG. 3 is a view for explaining a configuration of the CCD image sensor.

FIG. 3 is a view for explaining a configuration of the CCD image sensor 77 provided in the image capturing portion 61.

The CCD image sensor 77 includes: a sensor board 77a that is formed into a rectangle; and three pixel arrays 77R, 77G and 77B that are arranged side by side and attached to the sensor board 77a. In the following description, the three pixel arrays 77R, 77G and 77B are called a red pixel array 77R, a green pixel array 77G and a blue pixel array 77B, respectively. The red pixel array 77R, the green pixel array 77G and the blue pixel array 77B are each arranged to extend in the first scan direction X. Moreover, the red pixel array 77R, the green pixel array 77G and the blue pixel array 77B are arranged side by side in the second scan direction Y. The red pixel array 77R, the green pixel array 77G and the blue pixel array 77B are each constituted by linearly arranged k photodiodes PD (for example, k=8000 in the first exemplary embodiment). Furthermore, different color filters are attached respectively to the red pixel array 77R, the green pixel array 77G and the blue pixel array 77B, each of the color filters transmitting a different wavelength component.

FIGS. 4A and 4B are views for explaining a configuration of the light transmitting member 72 provided to the image capturing portion 61. Here, FIG. 4A is a bottom view of the light transmitting member 72 seen from the sheet transport path 55 side in FIG. 2, and FIG. 4B is a cross-sectional view taken along a line IVB-IVB in FIG. 4A. Here, FIG. 4B is a cross section of the light transmitting member 72 at the reading position RP in FIG. 2.

The opening 71a formed in the first housing 71 extends in the first scan direction X and the second scan direction Y, and has a rectangular shape that is larger in length in the first scan direction X than that in the second scan direction Y. The length of the opening 71a in the first scan direction X is set to be larger than the maximum size that is usable in the image forming apparatus shown in FIG. 1 (for example, 297 mm in the case of A3 short end feed (SEF)). Here, the first housing 71 is made of a material such as metal that does not transmit visible light.

Meanwhile, the light transmitting member 72 is held by the first housing 71 in a state of being fitted into the opening 71a as described above. Accordingly, similarly to the opening 71a, the light transmitting member 72 has a rectangular shape that is larger in length in the first scan direction X than that in the second scan direction Y. Moreover, the light transmitting member 72 is made of a material that is capable of transmitting visible light, for example, glass or plastic.

The light transmitting member 72 includes cyclic concaves and convexes at a surface on the sheet transport path 55 side when the image reader 60 is configured as shown in FIG. 2 (the surface to be referred to as a bottom surface; although the surface is on the upper side in FIG. 4B). More specifically, the bottom surface of the light transmitting member 72 includes: flat parts 72a each of which is formed to have a flat surface; and multiple protruding parts 72b that are an example of projection members projecting from the flat parts 72a toward the sheet transport path 55. Here, the protruding parts 72b are each formed to extend in the second scan direction Y. Accordingly, the sheet P is less likely to be caught by the protruding parts 72b than in a case when the protruding parts 72b are formed as dots, and thus sheet transportability is maintained. In the example shown in FIG. 4, 12 protruding parts 72b are formed in the first scan direction X at regular intervals. Thus, the protruding parts 72b are formed to be parallel to each other. In the first exemplary embodiment, the interval between each two adjacent protruding parts 72b in the first scan direction X is set at 30 mm. Each of the protruding parts 72b has a cross section in a semicircle, and is set to be 2 mm in length (width) in the first scan direction X and 1 mm in height from the flat parts 72a. Accordingly, the protruding parts 72b are each formed to cross the reading position RP, which is a reading area in the first direction, that is, a reading area in the second scan direction Y. Here, the interval between each two adjacent protruding parts 72b may be any length in the range between 10 mm and 40 mm both inclusive, for example. The protruding parts 72b are formed within a reading area in the second direction, that is, a reading area in the first scan direction X.

Meanwhile, a surface of the light transmitting member 72 that is opposite to the bottom surface thereof and is exposed to the inner side of the first housing 71 (the surface to be referred to as a top surface; although the surface is on the lower side in FIG. 4B) is formed of a flat surface.

Figure 5:
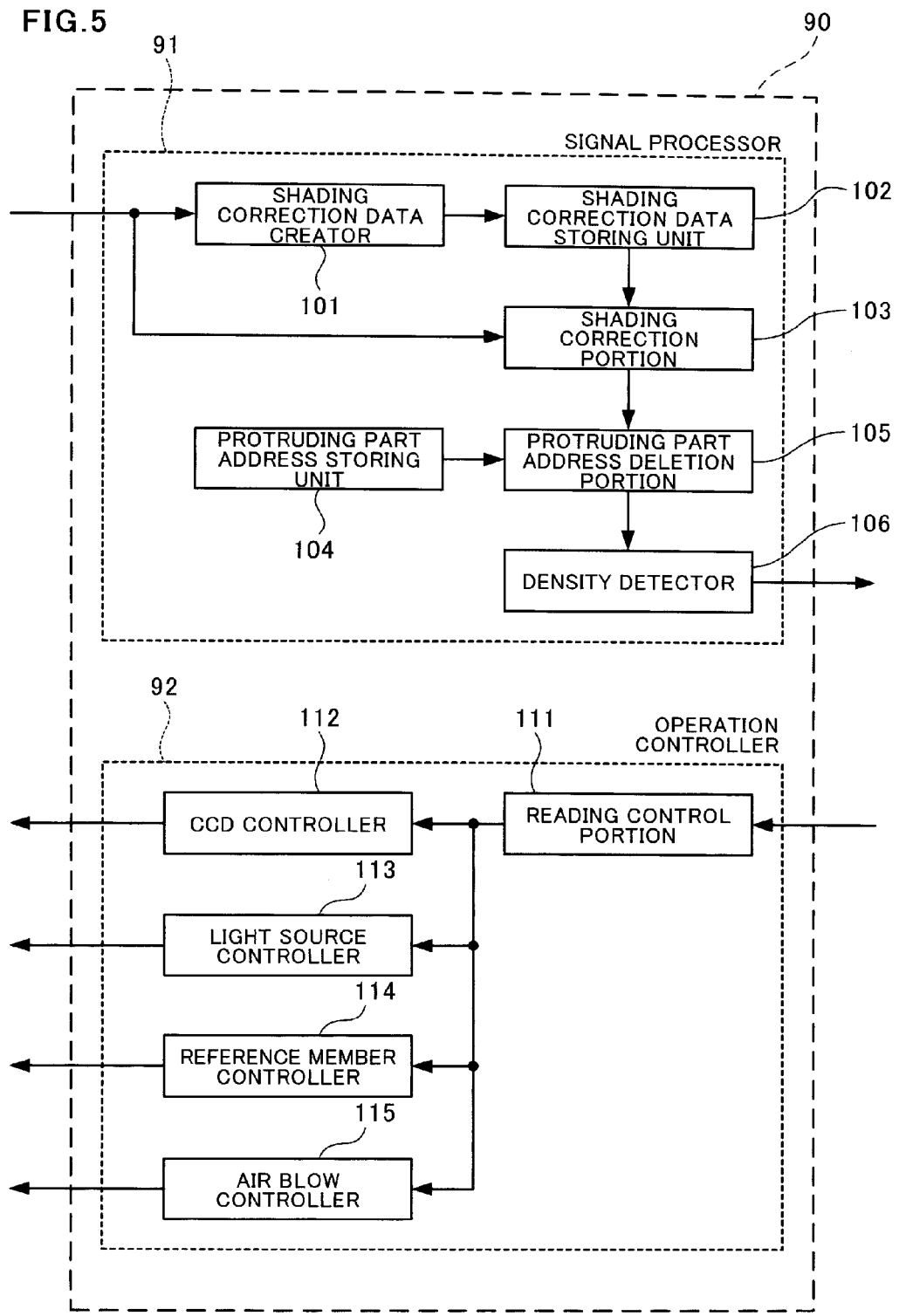
FIG. 5 shows a functional block diagram of the reading controller in the first exemplary embodiment.

FIG. 5 shows a functional block diagram of the reading controller 90 shown in FIG. 2. The reading controller 90 includes: a signal processor 91 that processes an image signal inputted by the CCD image sensor 77; and an operation controller 92 that controls operation of each portion of the image reader 60.

Among these, the signal processor 91 includes a shading correction data creator 101 and a shading correction data storing unit 102. The shading correction data creator 101 creates shading correction data for each of colors R, G and B on the basis of a result obtained by reading the reading reference member 82 by the CCD image sensor 77. The shading correction data storing unit 102 stores the created shading correction data for each of the colors R, G and B. The signal processor 91 further includes a shading correction portion 103 that performs shading correction on image data of each of the colors R, G and B obtained by reading an image on the sheet P by the CCD image sensor 77, by using the shading correction data of the corresponding one of the colors R, G and B read from the shading correction data storing unit 102. Moreover, the signal processor 91 includes a protruding part address storing unit 104 and a protruding part address deletion portion 105 as an example of a deletion unit. The protruding part address storing unit 104 stores a position of each of the red pixel array 77R, the green pixel array 77G and the blue pixel array 77B at which a light beam passing each of the protruding parts 72b of the light transmitting member 72 is formed as an image, as a pixel number of the corresponding photodiode PD of the corresponding one of the red pixel array 77R, the green pixel array 77G and the blue pixel array 77B, that is, a protruding part address. The protruding part address deletion portion 105 deletes, from image data of each of the colors R, G and B on which processing is performed by the shading correction portion 103, image data of the pixel address, corresponding to each of the protruding parts 72b, of the corresponding one of the colors R, G and B read from the protruding part address storing unit 104. The signal processor 91 also includes a density detector 106 that detects image density on the basis of the image data of each of the colors R, G and B on which processing is performed by the protruding part address deletion portion 105, and then outputs the result to the controller 1 of the image forming apparatus (see FIG. 1).

Meanwhile, the operation controller 92 includes a reading control portion 111 that controls the entire image reader 60 on the basis of an instruction from the controller 1 provided in the image forming apparatus (see FIG. 1). The operation controller 92 further includes a CCD controller 112, a light source controller 113, a reference member controller 114 and an air blow controller 115. The CCD controller 112 controls on and off of the CCD image sensor 77 (the red pixel array 77R, the green pixel array 77G and the blue pixel array 77B) shown in FIG. 3, and controls operation of the CCD image sensor 77 to capture image data, on the basis of an instruction by the reading control portion 111. The light source controller 113 controls turning-on and turning-off of the first light source 73 and the second light source 74 shown in FIG. 2. The reference member controller 114 exposes each of the surfaces of the reading reference member 82 shown in FIG. 2 to the sheet transport path 55 by rotating and stopping the reading reference member 82. The air blow controller 115 rotates and stops the fan of the air blower 63 shown in FIG. 2.

The image forming apparatus of the first exemplary embodiment causes the image formation section 30 to form a test image on the sheet P, causes the image reader 60 to read the test image formed on the sheet P, while the test image is transported, and then performs setting operation for various imaging conditions for adjusting image density of each color, on the basis of the result of the reading. Here, the imaging conditions to be set include image forming conditions in the image formation section 30 (a charging condition, an exposure condition and development condition in each of the image formation units 10Y, 10M, 10C and 10K) and the like, for example.

Next, the above-described processing for adjusting image density will be described in detail.

Firstly, calibration operation of the image reader 60 executed before adjusting image density will be described. This calibration operation is performed to correct reading properties attributable to intrinsic properties of the light sources, the optical system, the sensor and the like of the image reader 60, and to thereby reduce errors in image data obtained by reading an image on the sheet P. Here, the calibration operation may be particularly performed after the image forming apparatus is switched on, after a predetermined time period has passed since the last calibration operation, or after a predetermined number of sheets are outputted, for example.

Figure 6:
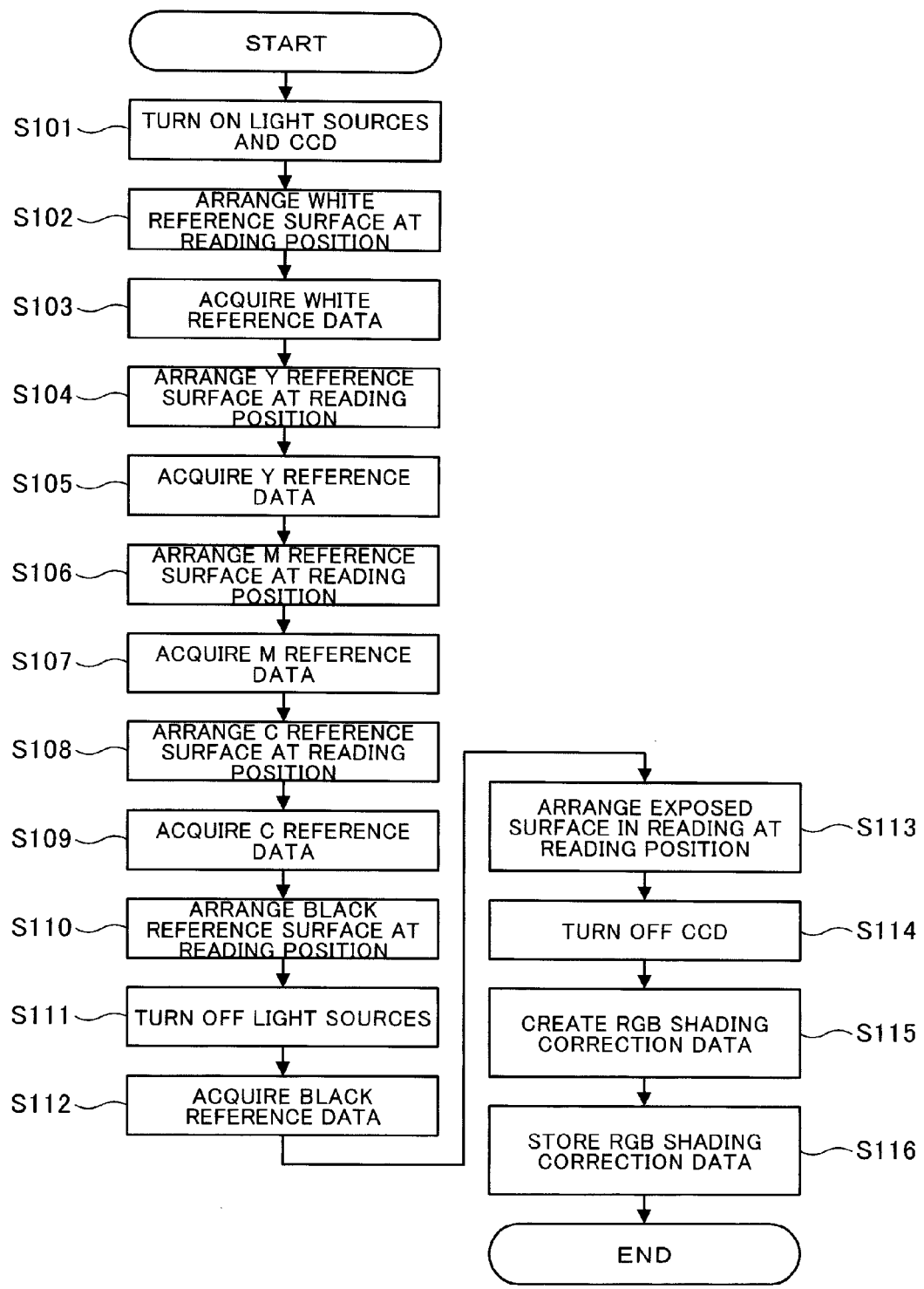
FIG. 6 is a flowchart showing a flow of the calibration operation in the image reader.

FIG. 6 is a flowchart showing a flow of the calibration operation.

When the controller 1 provides an instruction to start the calibration operation, the reading control portion 111 causes the light controller 113 to turn on the first light source 73 and the second light source 74, and also causes the CCD controller 112 to turn on the CCD image sensor 77 (the red pixel array 77R, the green pixel array 77G and the blue pixel array 77B) (Step 101).

Then, the reading control portion 111 causes the reference member controller 114 to rotate the reading reference member 82 and to stop the reading reference member 82 in a state where the white reference member is exposed to the sheet transport path 55, that is, the white reference surface is arranged at the reading position RP (Step 102). Thereafter, light beams emitted by the first light source 73 and the second light source 74 enter the white reference surface through the light transmitting member 72, the light beams reflected by the white reference surface enter the CCD image sensor 77 (the red pixel array 77R, the green pixel array 77G and the blue pixel array 77B) via the light transmitting member 72, the first mirror 75a, the second mirror 75b, the third mirror 75c and the lens system 76, and thereby white reference data based on the reflected light beams from the white reference surface is acquired (Step 103). Then, the white reference data is stored in a memory (not shown in the figure) provided to the shading correction data creator 101.

Thereafter, the reading control portion 111 causes the reference member controller 114 to rotate the reading reference member 82 and to stop the reading reference member 82 in a state where the Y reference member is exposed to the sheet transport path 55, that is, the Y reference surface is arranged at the reading position RP (Step 104). Thereafter, in the same manner as in Step 103, Y reference data based on reflected light beams from the Y reference surface is acquired (Step 105). Then, the Y reference data is also stored in the memory (not shown in the figure) provided to the shading correction data creator 101.

Subsequently, the reading control portion 111 causes the reference member controller 114 to rotate the reading reference member 82 and to stop the reading reference member 82 in a state where the M reference member is exposed to the sheet transport path 55, that is, the M reference surface is arranged at the reading position RP (Step 106). Thereafter, in the same manner as in Step 105, M reference data based on reflected light beams from the M reference surface is acquired (Step 107). Then, the M reference data is also stored in the memory (not shown in the figure) provided to the shading correction data creator 101.

Furthermore, the reading control portion 111 causes the reference member controller 114 to rotate the reading reference member 82 and to stop the reading reference member 82 in a state where the C reference member is exposed to the sheet transport path 55, that is, the C reference surface is arranged at the reading position RP (Step 108). Thereafter, in the same manner as in Step 107, C reference data based on reflected light beams from the C reference surface is acquired (Step 109). Then, the C reference data is also stored in the memory (not shown in the figure) provided to the shading correction data creator 101.

Subsequently, the reading control portion 111 causes the reference member controller 114 to rotate the reading reference member 82 and to stop the reading reference member 82 in a state where the black reference member is exposed to the sheet transport path 55, that is, the black reference surface is arranged at the reading position RP (Step 110). Moreover, the reading control portion 111 causes the light source controller 113 to turn off the first light source 73 and the second light source 74 that are currently turned on (Step 111). Thereafter, in the same manner as in Step 109, black reference data based on reflected light beams from the black reference surface is acquired (Step 112). Then, the black reference data is also stored in the memory (not shown in the figure) provided to the shading correction data creator 101.

Thereafter, the reading control portion 111 causes the reference member controller 114 to rotate the reading reference member 82 and to stop the reading reference member 82 in a state where the exposed surface in reading is exposed to the sheet transport path 55, that is, the exposed surface in reading is arranged at the reading position RP (Step 113), to be ready for the sheet P to be transported. Moreover, the reading control portion 111 causes the CCD controller 112 to turn off the CCD image sensor 77 (the red pixel array 77R, the green pixel array 77G and the blue pixel array 77B) (Step 114).

Meanwhile, in the signal processor 91, the shading correction data creator 101 creates shading correction data of the red pixel array 77R (red shading correction data), shading correction data of the green pixel array 77G (green shading correction data) and shading correction data of the blue pixel array 77B (blue shading correction data), by using the white reference data, the Y reference data, the M reference data, the C reference data and the black reference data acquired in Steps 103, 105, 107, 109 and 112, respectively (Step 115). Then, the shading correction data creator 101 stores, in the shading correction data storing unit 102, the red shading correction data, the green shading correction data and the blue shading correction data thus created (Step 116), and thereafter completes the calibration operation.

Here, the shading correction data of each of the colors R, G and B is set for each of the photodiodes PD constituting the pixel array of the corresponding color. Accordingly, each of the red shading correction data, the green shading correction data and the blue shading correction data is data associating each of the pixel numbers 1 to k of the photodiodes PD with a shading correction value set for the corresponding pixel number.

Figure 7:
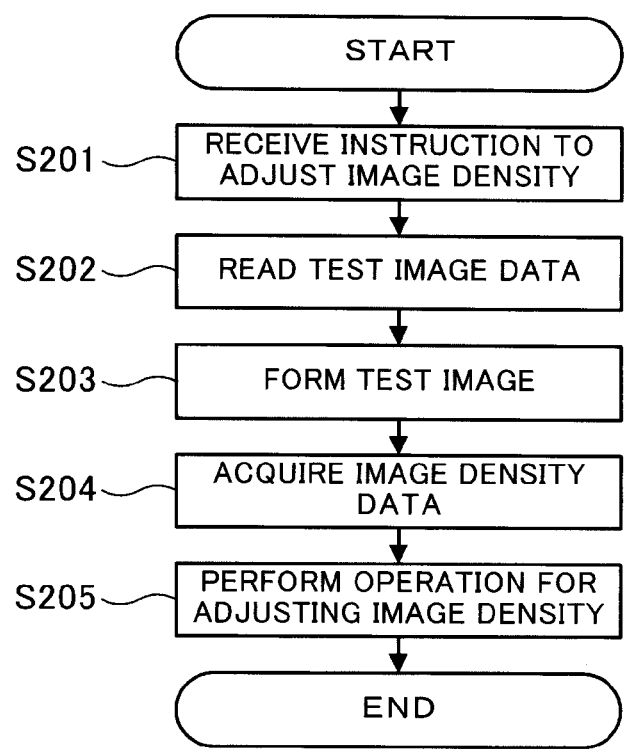
FIG. 7 is a flowchart showing a flow of entire process performed by the image forming apparatus in the operation for adjusting image density in the first exemplary embodiment.

FIG. 7 is a flowchart showing a flow of entire process performed by the image forming apparatus in the operation for adjusting image density. Note that, although the operation for adjusting image density may be performed regularly, a description will be given here of a case in which the operation is performed in response to an instruction by a user.

Upon receipt of an instruction to adjust image density from a user interface or the like not shown in the figure (Step 201), the controller 1 reads test image data stored in the memory not shown in the figure (Step 202), and provides instruction to form a test image on the sheet P on the basis of the read test image data (Step 203). More specifically, the controller 1 causes the image formation unit 10Y, 10M, 10C and 10K to each form an image of the corresponding color based on the test image data and to primarily transfer the images thus formed onto the intermediate transfer belt 21 in sequence. Thereafter, the controller 1 causes the overlaid images of the respective colors to be collectively transferred onto the sheet P and to be fixed to the sheet P. Subsequently, the controller 1 acquires image density data based on a result obtained by causing the image reader 60 to read the fixed test image on the sheet P (Step 204), provides instruction to perform the operation for adjusting image density in each of the image formation units 10Y, 10M, 10C and 10K on the basis of the acquired image density data (Step 205), and then completes the entire process.

Figure 8:
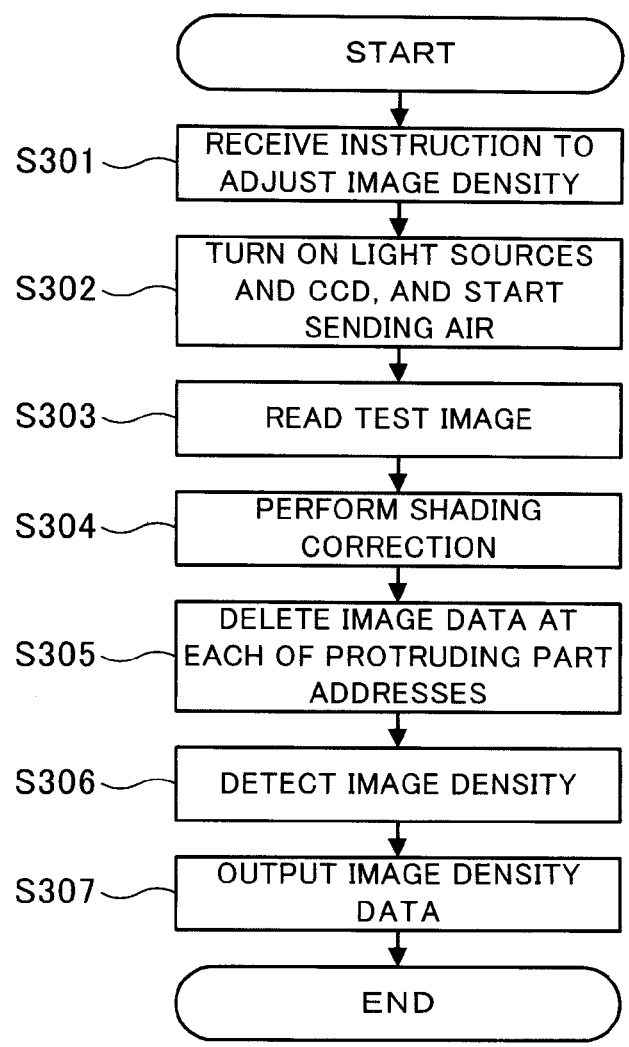
FIG. 8 is a flowchart showing a flow of a process performed by the image reader in the operation for adjusting the image density in the first exemplary embodiment.

FIG. 8 is a flowchart showing a flow of a process performed by the image reader 60 in the above-described operation for adjusting the image density.

Upon receipt of an instruction to adjust image density from the controller 1 (Step 301), the reading control portion 111 causes the light source controller 113 to turn on the first light source 73 and the second light source 74, causes the CCD controller 112 to turn on the CCD image sensor 77 (the red pixel array 77R, the green pixel array 77G and the blue pixel array 77B), and also causes the air blower 63 to start sending air (Step 302).

Thereafter, as the sheet P which has passed through the fixing unit 50 and on which the test image is fixed passes through the reading position RP, the CCD image sensor 77 reads the test image formed on the sheet P (Step 303).

More specifically, the reading of the test image is performed as follows. When the sheet P transported in the second scan direction Y in the sheet transport path 55 passes under the light transmitting member 72, firstly, light beams reflected at a part of the sheet P reaching the reading position RP form an image on each of the red pixel array 77R, the green pixel array 77G and the blue pixel array 77B provided to the CCD image sensor 77, via the light transmitting member 72, the first mirror 75a, the second mirror 75b, the third mirror 75c and the lens system 76, the part of the sheet P corresponding to a first row in the second scan direction Y, and one line in the first scan direction X. Thereby, an image in the first row in the second scan direction Y is read at once as an image corresponding to the one line in the first scan direction X. Subsequently, as the sheet P further moves in the second scan direction Y, light beams reflected at a part of the sheet P reaching the reading position RP forms an image on each of the red pixel array 77R, the green pixel array 77G and the blue pixel array 77B provided to the CCD image sensor 77, via the light transmitting member 72, the first mirror 75a, the second mirror 75b, the third mirror 75c and the lens system 76, the part of the sheet P corresponding to a second row in the second scan direction Y, and one line in the first scan direction X. Thereby, an image in the second row in the second scan direction Y is read at once as an image corresponding to the one line in the first scan direction X. By repeating this operation for the entire area of the sheet P in the transport direction of the sheet P, that is, in the second scan direction Y, the image for the whole sheet P is read.

During this operation, the sheet P on which the test image is formed passes through the reading position RP while being transported in the second scan direction Y in the sheet transport path 55. At this event, the image formation surface of the sheet P is transported so as not to come in contact with the flat parts 72a provided to the light transmitting member 72 although coming in contact with the protruding parts 72b in some cases. Accordingly, stains of toner and the like may be attached to the protruding parts 72b due to the contact of the sheet P, but are less likely to be attached to the flat parts 72a.

In addition, in the first exemplary embodiment, air is sent to the image formation surface of the sheet P by using the air blower 63 on the upstream side of the reading position RP in the second scan direction Y. Thereby, an airflow in the second scan direction Y occurring between the image formation surface of the sheet P and the light transmitting member 72 operates to separate the image formation surface of the sheet P from the protruding parts 72b provided to the light transmitting member 72. With this configuration, the image formation surface of the sheet P is less likely to come in contact with the protruding parts 72b. Moreover, even when foreign objects such as dust attach to the flat parts 72a and protruding parts 72b, the foreign objects are blown off easily by the air thus sent.

As a result of reading the test image formed on the sheet P in Step 303, red component image data of the test image on the single sheet P is acquired by the red pixel array 77R, green component image data of the test image on the single sheet P is acquired by the green pixel array 77G, and blue component image data of the test image on the single sheet P is acquired by the blue pixel array 77B. Then, the red component image data, the green component image data and the blue component image data thus acquired are inputted to the shading correction portion 103. Here, the red component image data, the green component image data and the blue component image data are each inputted into the shading correction portion 103 in such a manner that each line thereof in the first scan direction X is inputted at a time. Moreover, the shading correction portion 103 reads, from the shading correction data storing unit 102, red shading correction data, green shading correction data and blue shading correction data.

Then, the shading correction portion 103 performs shading correction on the inputted image data (Step 304). More specifically, the shading correction portion 103 performs shading correction on each line, in the first scan direction X, of the red component image data inputted by the red pixel array 77R, by using the red shading correction data, performs shading correction on each line, in the first scan direction X, of the green component image data inputted by the green pixel array 77G, by using the green shading correction data, and performs shading correction on each line, in the first scan direction X, of the blue component image data inputted by the blue pixel array 77B, by using the blue shading correction data. Thereafter, the red component image data, the green component image data and the blue component image data thus subjected to the shading correction are outputted to the protruding part address deletion portion 105. Moreover, the protruding part address deletion portion 105 reads protruding part addresses from the protruding part address storing unit 104.

Subsequently, the protruding part address deletion portion 105 deletes image data at each of the protruding part addresses from the image data thus inputted (Step 305). More specifically, the protruding part address deletion portion 105 deletes image data at each protruding part address from the red component image data, deletes image data at each protruding part address from the green component image data, and deletes image data at each protruding part address from the blue component image data. Then, the red component image data, the green component image data and the blue component image data thus subjected to the deletion of the image data at the protruding part addresses are outputted to the density detector 106.

Thereafter, the density detector 106 detects the image density on the basis of the inputted image data (Step 306). More specifically, the density detector 106 converts the inputted red component image data, green component image data and blue component image data, that is, luminance data of the respective colors R, G and B, into density data of the respective colors Y, M and C, that is, yellow component image data, magenta component image data and cyan component image data. Then, on the basis of the yellow component image data, magenta component image data and cyan component image data thus obtained, the density detector 106 detects image density for each of the pixels constituting the image of the single sheet P.

Then, the density detector 106 outputs the obtained image density data of the single sheet P to the controller 1 (Step 307), and completes the entire process.

Here, there is no problem even if the order of Steps 304 and 305 is reversed.

Figure 9:
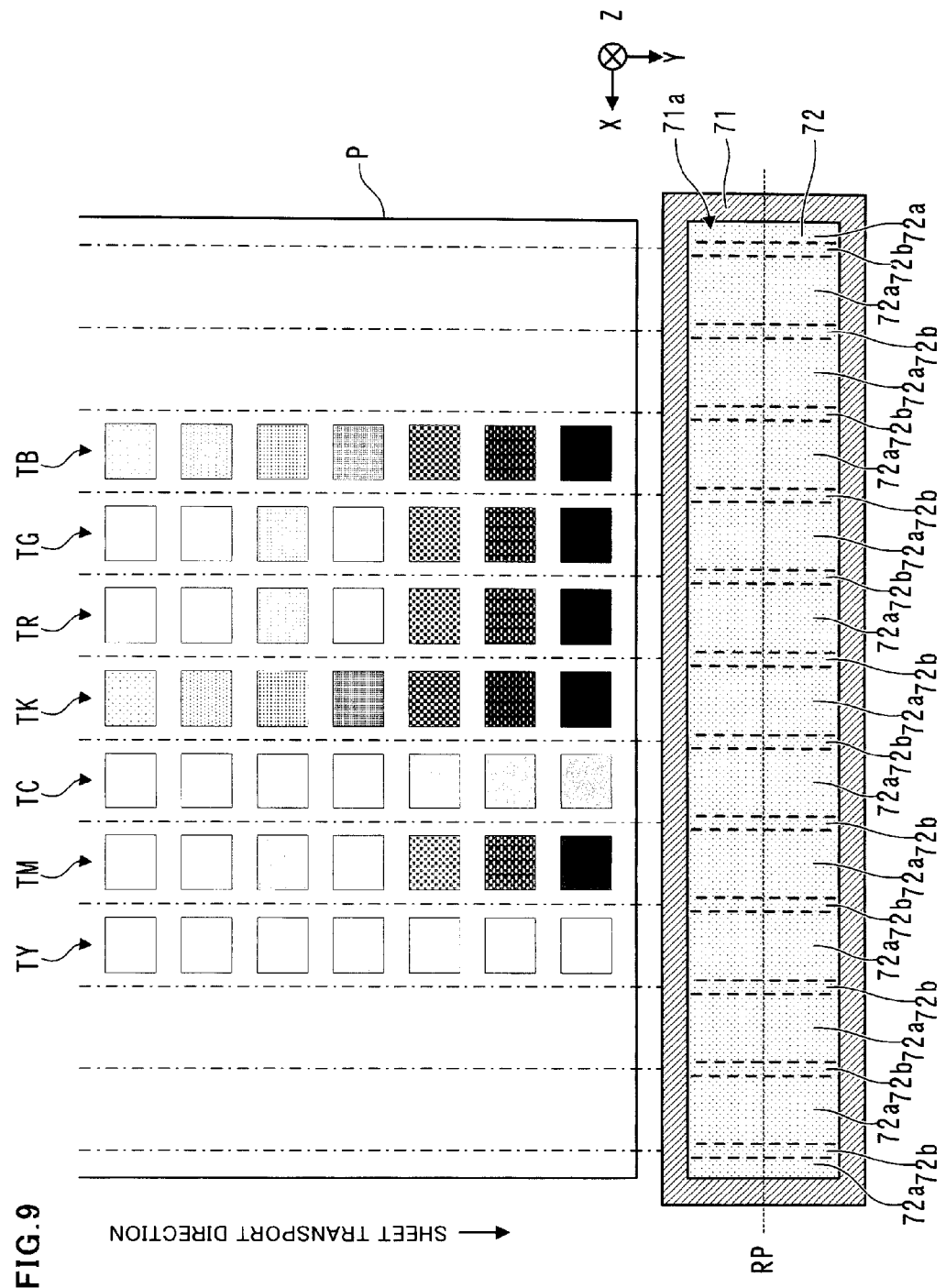
FIG. 9 is a view showing an example of the test image formed on the sheet.

FIG. 9 is a view showing an example of the test image formed on the sheet P in the above-described operation for adjusting image density.

In the example shown in FIG. 9, a yellow patch image TY, a magenta patch image TM, a cyan patch image TC, a black patch image TK, a red patch image TR, a green patch image TG and a blue patch image TB are formed as the test image.

Moreover, each of the yellow patch image TY, the magenta patch image TM, the cyan patch image TC, the black patch image TK, the red patch image TR, the green patch image TG and the blue patch image TB includes seven images different in density. Here, the images are each formed into a square, and each side of the square is set at 20 mm, for example.

Moreover, in this example, the yellow patch image TY, the magenta patch image TM, the cyan patch image TC, the black patch image TK, the red patch image TR, the green patch image TG and the blue patch image TB are formed side by side in the first scan direction X, and the images of the respective densities constituting each of the yellow patch image TY, the magenta patch image TM, the cyan patch image TC, the black patch image TK, the red patch image TR, the green patch image TG and the blue patch image TB are formed side by side in the second scan direction Y. Thus, the images of the respective densities of the colors are formed in a matrix. Moreover, the positions at which the images are formed on the sheet P are areas that face the flat parts 72a while not facing the protruding parts 72b at the time when the sheet P passes under the light transmitting member 72 provided to the image reader 60.

Figure 10A:
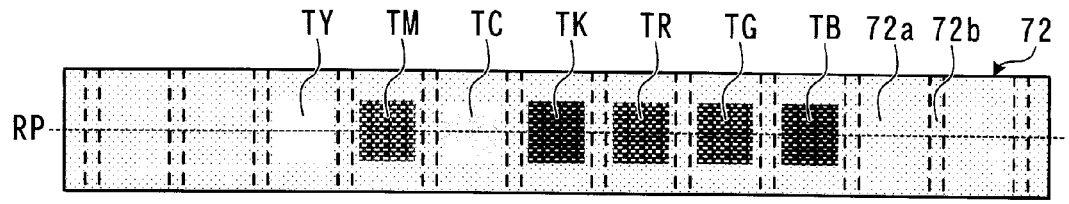
FIGS. 10A to 10D are diagrams for explaining an example of processing performed by the signal processor when the test image shown in is read.
Figure 10B:
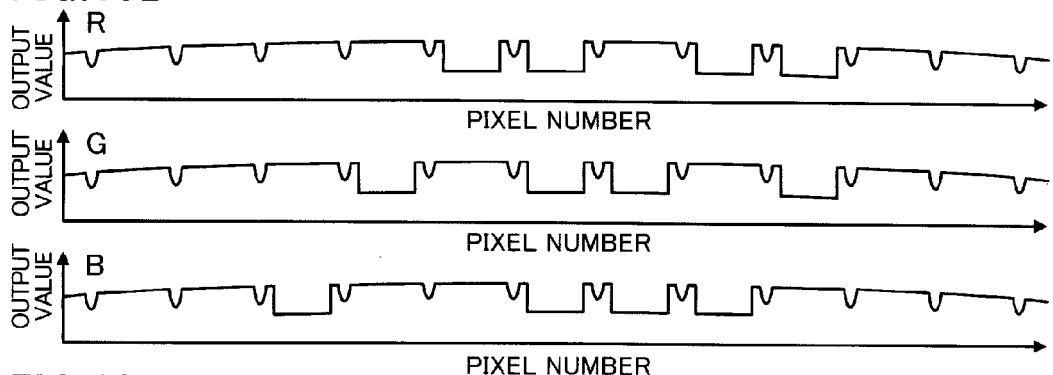
Figure 10C:
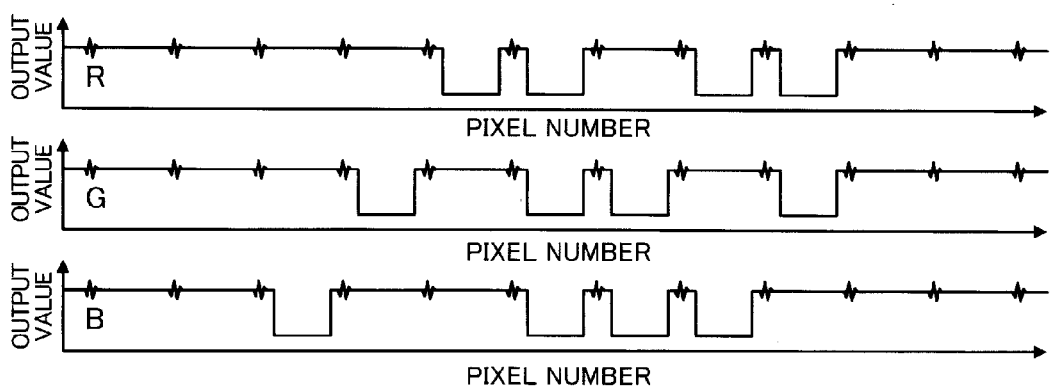
Figure 10D:
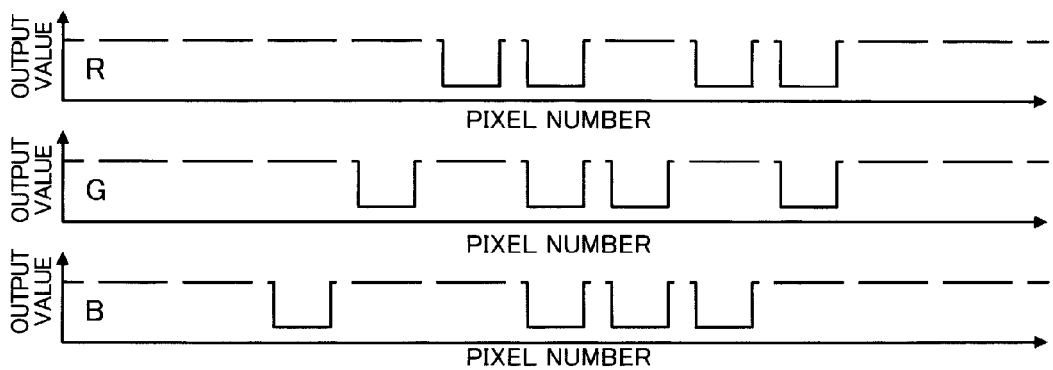

FIGS. 10A to 10D are diagrams for explaining an example of processing performed by the signal processor 91 (see FIG. 5) when the test image shown in FIG. 9 is read. FIG. 10A shows a positional relationship between the light transmitting member 72 and the image of each color. Here, FIG. 10A illustrates a state in which images of the respective colors arranged in a line in the first scan direction X pass through the reading position RP, among the images constituting the yellow patch image TY, the magenta patch image TM, the cyan patch image TC, the black patch image TK, the red patch image TR, the green patch image TG and the blue patch image TB. Moreover, FIG. 10B shows red component image data (R), green component image data (G), and blue component image data (B) for one line in the first scan direction X inputted to the shading correction portion 103 as a result of reading of the images shown in FIG. 10A by the red pixel array 77R, the green pixel array 77G and the blue pixel array 77B. Further, FIG. 10C shows the red component image data (R), the green component image data (G), and the blue component image data (B) for the one line in the first scan direction X after the shading correction, which are outputted from the shading correction portion 103 and inputted to the protruding part address deletion portion 105. Furthermore, FIG. 10D shows the red component image data (R), the green component image data (G), and the blue component image data (B) for the one line in the first scan direction X after deletion of image data at each protruding part address, which are outputted from the protruding part address deletion portion 105 and inputted to the density detector 106. In each of FIGS. 10B to 10D, the horizontal axis shows the pixel numbers (1 to K) of the red pixel array 77R, the green pixel array 77G and the blue pixel array 77B, while the vertical axis shows output values at the respective pixel numbers.

As shown in FIG. 10B, the red component image data outputted from the red pixel array 77R, the green component image data outputted from the green pixel array 77G and the blue component image data outputted from the blue pixel array 77B each include error components attributable to, for example, unevenness of light amount from the first light source 73 and the second light source 74 and unevenness of sensitivity of each photodiode PD constituting the pixel array of the corresponding color. In addition, the image data of each of the color components includes both output values from parts receiving light beams passing through the flat parts 72a of the light transmitting member 72 and output values of parts receiving light beams passing through the protruding parts 72b of the light transmitting member 72. Here, the amount of light received after passing through each of the protruding parts 72b tends to be smaller than that received after passing through each of the flat parts 72a. This is considered to result from reduction in the amount of light transmitted toward the CCD image sensor 77 after passing through the protruding parts 72b, due to the shape of the protruding parts 72b. In the first exemplary embodiment, since the protruding parts 72b are formed respectively at twelve parts in the first scan direction X, the number of parts having a locally reduced light amount is also twelve.

By the shading correction performed by the shading correction portion 103, error components attributable to, for example, in the unevenness of light amount from the first light source 73 and the second light source 74 and the unevenness of sensitivity of each photodiode PD constituting the pixel array of the corresponding color are removed from each of the red component image data, the green component image data and the blue component image data as shown in FIG. 10C. Here, more errors remain, without being removed, in the parts receiving light beams passing through the protruding parts 72b of the light transmitting member 72 than in the parts receiving light beams passing through the flat parts 72a of the light transmitting member 72, because of the indefiniteness of light amount due to the protruding parts 72b.

In the first exemplary embodiment, the protruding part address deletion portion 105 deletes image data, that is, an output value, of each of the pixel numbers corresponding to the parts receiving light beams after passing through the protruding parts 72b. Thereby, the output values of the parts each having indefinite light amount are deleted from each of the red component image data, the green component image data and the blue component image data as shown in FIG. 10D, and only output values of the pixel numbers corresponding to the parts receiving light beams after passing through the flat parts 72a are outputted to the density detector 106. Accordingly, the density detector 106 detects image density of each of the colors Y, M and C in a state where errors attributable to the protruding parts 72b are removed from the image data. Hence, accuracy in detecting image density of each of the colors Y, M and C is improved.

In particular, when the test image shown in FIG. 9 is formed on the sheet P, the images pass through the facing parts facing the flat parts 72a of the light transmitting member 72 at the reading position RP without passing through the facing parts facing the protruding parts 72b. Accordingly, errors in light amount attributable to the protruding parts 72b and errors in density detection of each of the colors Y, M and C attributable to the protruding parts 72b are further reduced.

Moreover, as described above, in the first exemplary embodiment, such a configuration is made that the image formation surface of the transported sheet P would be more likely to come in contact with the protruding parts 72b provided to the light transmitting member 72 and less likely to come in contact with the flat parts 72a. Thereby, foreign objects such as toner and paper dust are less likely to attach to the flat parts 72a. With this configuration, a reduction in light amount attributable to attached foreign objects is less likely to occur in light beams entering the CCD image sensor 77 after passing through the flat parts 72a, thus improving the accuracy in detecting image density of each of the colors Y, M and C in this respect as well. Further, in the first exemplary embodiment, such a configuration is made that the air blower 63 sends air. With this configuration, even when foreign objects attach to the flat parts 72a, the foreign objects are blown off by the air thus sent. Further, in the first exemplary embodiment, density detection does not use light beams entering the CCD image sensor 77 after passing through the protruding parts 72b in the operation for adjusting image density. Accordingly, even when foreign objects attach to the protruding parts 72b, no problem arises in adjusting image density.

Figure 11:
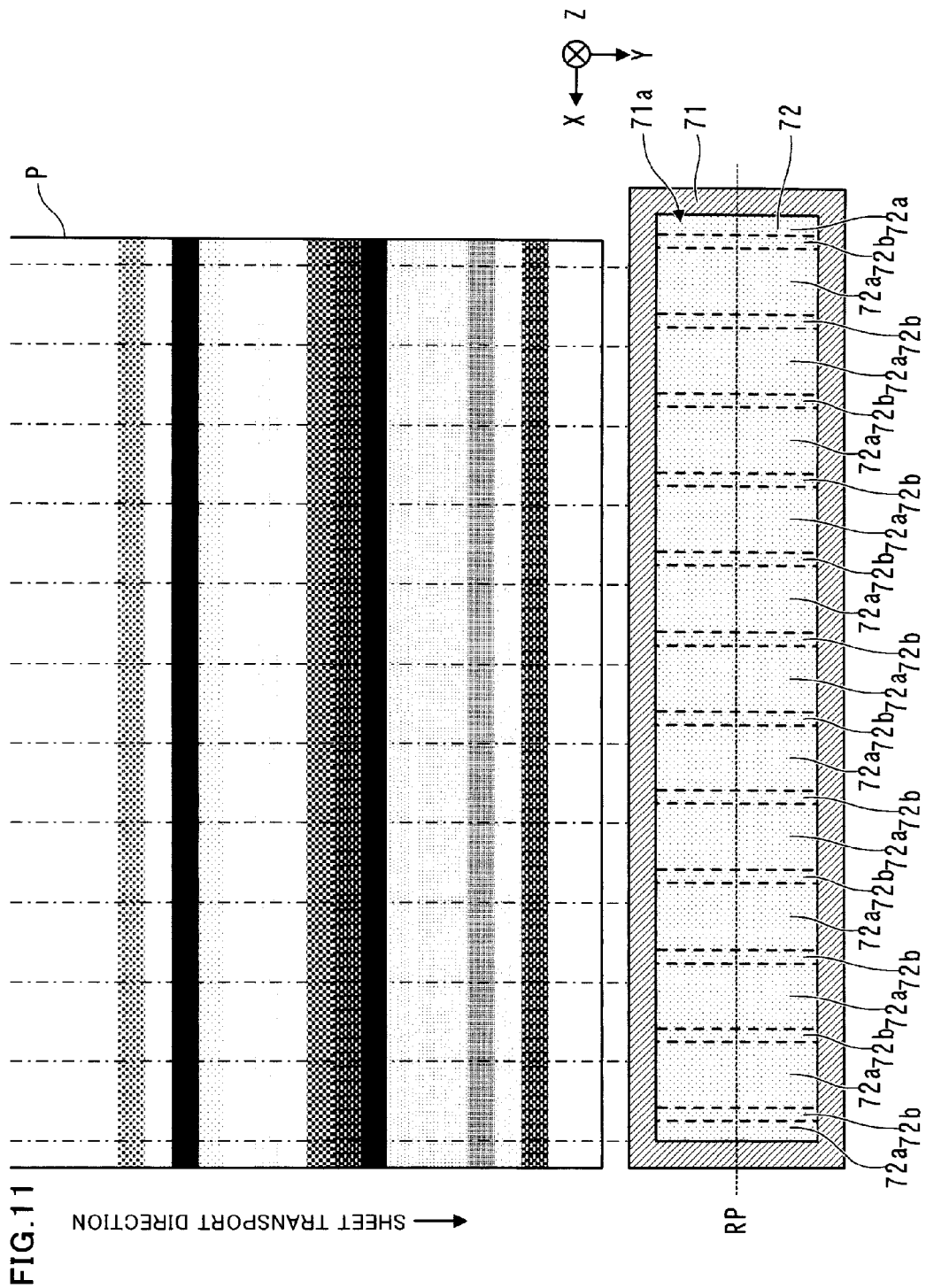
FIG. 11 is a view showing another example of the test image formed on the sheet.

Here, FIG. 11 is a view showing another example of the test image formed on the sheet P in the above-described operation for adjusting image density.

In the example shown in FIG. 11, yellow, magenta, cyan, black, red, green and blue images are formed as a test image to each extend in the first scan direction X. Thus, the image of each color is formed to cross the multiple protruding parts 72b provided to the light transmitting member 72. Even when such a test image is used, errors in detecting density of the image of each of the colors Y, M and C attributable to the protruding parts 72b are reduced by performing the above-described operation for adjusting image density.

Note that, although the multiple protruding parts 72b are formed to be parallel to each other in the second scan direction Y in the first exemplary embodiment, formation of the multiple protruding parts 72b is not limited thereto.

FIGS. 12A and 12B are views for explaining another configuration of the light transmitting member 72 provided to the image capturing portion 61. FIG. 12A is a bottom view of the light transmitting member 72 seen from the sheet transport path 55 side in FIG. 2, and FIG. 12B is a cross-sectional view taken along a line XIIB-XIIB in FIG. 12A. Here, FIG. 12B shows a cross section of the light transmitting member 72 at the reading position RP shown in FIG. 2.

In the example shown in FIGS. 12A and 12B, six protruding parts 72b on the left side of the figures are each formed to extend outwardly from the upstream side to the downstream side in the second scan direction Y, while six protruding parts 72b on the right side of the figures are each formed to extend outwardly from the upstream side to the downstream side in the second scan direction Y.

The sheet P that has passed through the fixing unit 50 shown in FIG. 1 may be transported in a so-called oblique state where the sheet P is oblique with respect to the second scan direction Y in some cases. However, when the configuration shown in FIGS. 12A and 12B are employed, an end part of the sheet P transported in such an oblique state is less likely to be caught by the protruding parts 72b. Hence, occurrence of jams of the sheet P attributable to an end part of the sheet P caught by the protruding parts 72b is suppressed.

Moreover, although the multiple protruding parts 72b and the light transmitting member 72 are integrally formed of the same material in the first exemplary embodiment, formation of the protruding parts 72b and the light transmitting member 72 is not limited thereto.

Figure 13A:
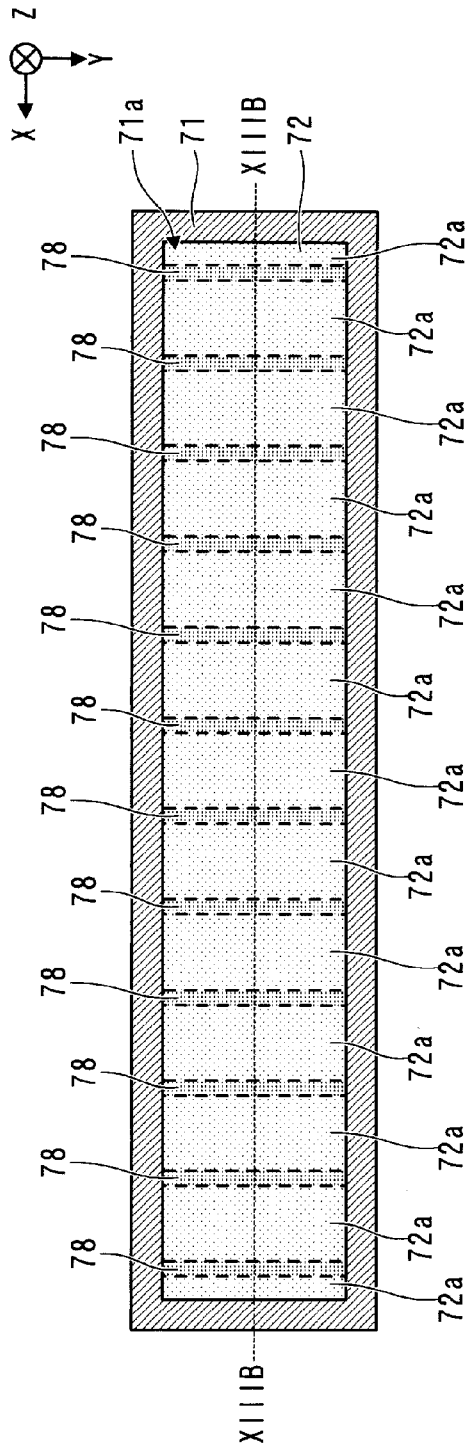
FIGS. 13A and 13B are views for explaining still another configuration of the light transmitting member.
Figure 13B:
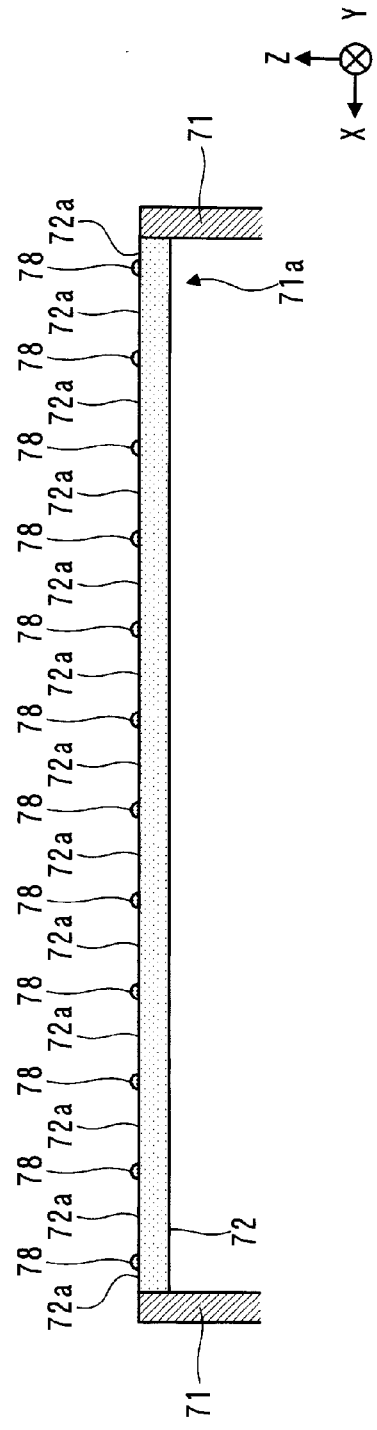

FIGS. 13A and 13B are views for explaining still another configuration of the light transmitting member 72 provided to the image capturing portion 61. FIG. 13A is a bottom view of the light transmitting member 72 seen from the sheet transport path 55 side in FIG. 2, and FIG. 13B is a cross-sectional view taken along a line XIIIB-XIIIB in FIG. 13A. Here, FIG. 13B shows a cross section of the light transmitting member 72 at the reading position RP shown in FIG. 2.

In the example shown in FIGS. 13A and 13B, an upper surface and a lower surface of the light transmitting member 72 are each formed of a flat surface, and multiple protruding parts 78 made of, for example, resin are formed on the lower surface of the light transmitting member 72 to protrude toward the sheet transport path 55. The protruding parts 78 are each formed to extend in the second scan direction Y, and 12 protruding parts 78 are provided at regular intervals in the first scan direction X in the example shown in FIGS. 13A and 13B. Here, the interval between each two adjacent protruding parts 78 in the first scan direction X is set at 30 mm. Moreover, each of the protruding parts 78 has a cross section in a semicircle, and is set to be 2 mm in length (width) in the first scan direction X and 1 mm in height from the flat parts 72a. Accordingly, the protruding parts 78 are each formed to cross the reading position RP.

The protruding parts 78 shown in FIGS. 13A and 13B are formed by attaching a resin material to the lower surface of the light transmitting member 72 by using an ink-jet printing technique, for example, the resin material being capable of transmitting visible light. Here, as the resin material forming the protruding parts 78, a material being excellent in adhesion to the light transmitting member 72 and also having high abrasion resistance with respect to the sheet P may be used. Further, a material having conductivity may be used as the resin material forming the protruding parts 78.

Even when such a configuration is employed, the sheet P being transported comes into contact with the protruding parts 78 before the flat parts 72a of the light transmitting member 72, thus suppressing attachment of stains to the flat parts 72a. As a result, an influence of errors on a density detection result of the test image read through the flat parts 72a is reduced. Here, when a conductive material is used as the resin material forming the protruding parts 78, the protruding parts 78 may be provided to be in contact with the first housing 71 and the first housing 71 may be electrically grounded in order that foreign objects such as toner or paper dust may be less likely to attach to the protruding parts 78.

FIGS. 14A and 14B are views for explaining still another configuration of the light transmitting member 72 provided to the image capturing portion 61. FIG. 14A is a bottom view of the light transmitting member 72 seen from the sheet transport path 55 side in FIG. 2, and FIG. 14B is a cross-sectional view taken along a line XIVB-XIVB in FIG. 14A. Here, FIG. 14B shows a cross section of the light transmitting member 72 at the reading position RP shown in FIG. 2.

In the example shown in FIGS. 14A and 14B, the upper surface and the lower surface of the light transmitting member 72 are each formed of a flat surface, and multiple protruding parts 79 made of, for example, metal are formed on the lower surface of the light transmitting member 72 to protrude toward the sheet transport path 55. The protruding parts 79 are each formed to extend in the second scan direction Y, and 12 protruding parts 79 are provided at regular intervals in the first scan direction X in the example shown in FIGS. 14A and 14B. Here, the interval between each two adjacent protruding parts 79 in the first scan direction X is set at 30 mm. Moreover, each of the protruding parts 79 has a cross section in a circle, and is set to have a diameter of 2 mm. Accordingly, the protruding parts 79 are each formed to cross the reading position RP.

The protruding parts 79 shown in FIGS. 14A and 14B are each formed by bonding a cut metal wire such as a piano wire to the lower surface of the light transmitting member 72. Thus, in this example, the protruding parts 79 are not capable of transmitting visible light.

Even when such a configuration is employed, the sheet P being transported comes into contact with the protruding parts 79 before the flat parts 72a of the light transmitting member 72, thus suppressing attachment of stains to the flat parts 72a. As a result, an influence of errors on a density detection result of the test image read through the flat parts 72a is reduced. Here, the protruding parts 79 may be provided to be in contact with the first housing 71 and the first housing 71 may be electrically grounded, in order that foreign objects such as toner or paper dust may be less likely to attach to the protruding parts 79.

Further, the light transmitting member 72 is fitted into the opening 71a formed in the first housing 71 of the image capturing portion 61 constituting the image reader 60, to perform reading of an image formed on the sheet P through the light transmitting member 72, in the first exemplary embodiment. However, the configuration is not limited to the above-described one.

Figure 15A:
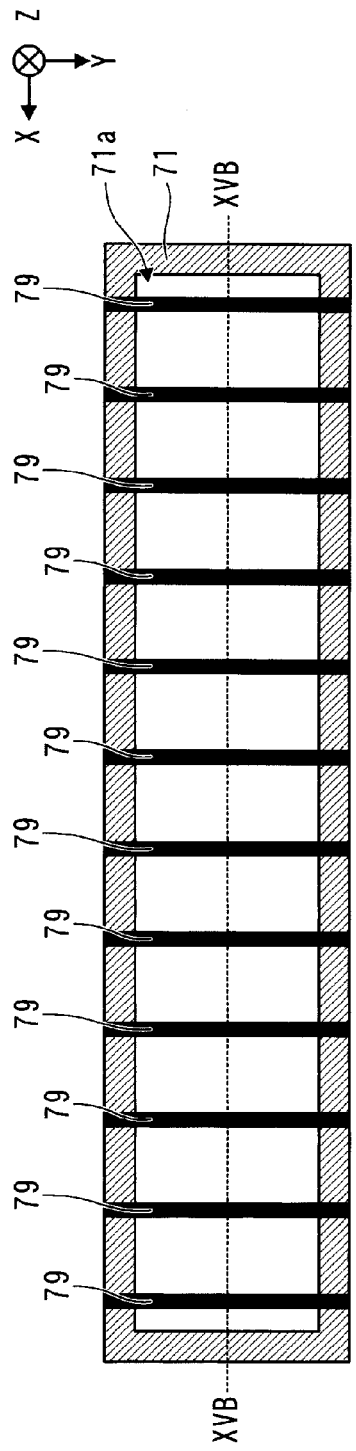
FIGS. 15A and 15B are views for explaining a configuration in which no light transmitting member is provided to the opening.
Figure 15B:
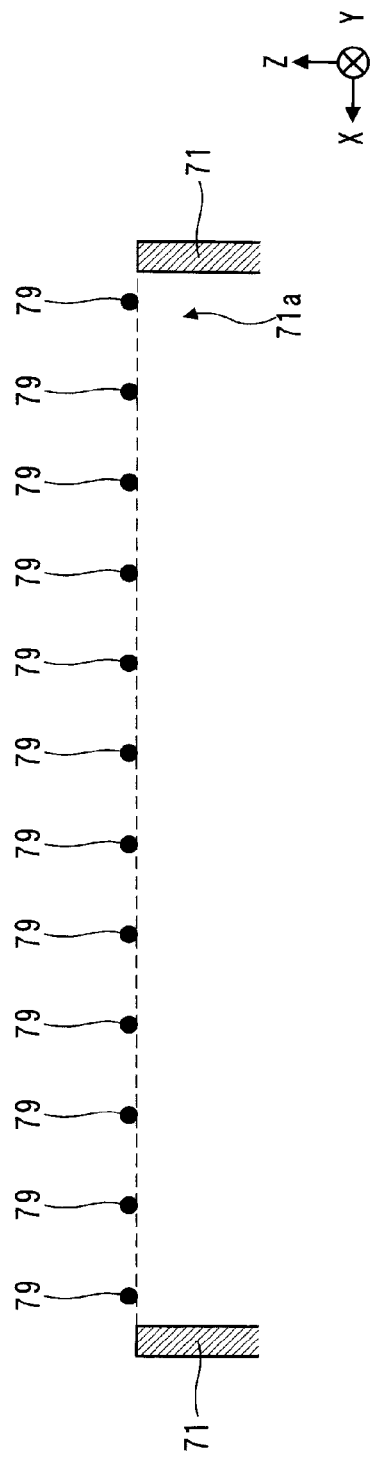

FIGS. 15A and 15B are views for explaining a configuration in which no light transmitting member 72 is provided to the opening 71a as an example of an opening portion. FIG. 15A is a bottom view of the opening 71a seen from the sheet transport path 55 side in FIG. 2, and FIG. 15B is a cross-sectional view taken along a line XVB-XVB in FIG. 15A. Here, FIG. 15B shows a cross section of the opening 71a at the reading position RP shown in FIG. 2.

As in the example shown in FIGS. 14A and 14B, the multiple protruding parts made of, for example, metal are formed to protrude toward the sheet transport path 55 in the example shown in FIGS. 15A and 15B as well. The protruding parts 79, which are an example of line members, are each formed to extend in the second scan direction Y, and 12 protruding parts 79 are provided at regular intervals in the first scan direction X. Here, the interval between each two adjacent protruding parts 79 in the first scan direction X is set at 30 mm. Moreover, each of the protruding parts 79 has a cross section in a circle, and is set to have a diameter of 2 mm. Accordingly, the protruding parts 79 are each formed to cross the reading position RP.

The protruding parts 79 shown in FIGS. 15A and 15B are each formed of a cut metal wire such as a piano line, similarly to that shown in FIGS. 14A and 14B. However, since no light transmitting member 72 is provided to the opening 71a in this example, each portions of the protruding parts 79 on the upstream side in the second scan direction Y is bonded and thereby fixed to an area of the first housing 71 on the upstream side of the opening 71a in the second scan direction Y, while each portions of the protruding parts 79 on the downstream side in the second scan direction Y is bonded and thereby fixed to an area of the first housing 71 on the downstream side of the opening 71a in the second scan direction Y.

When such a configuration is employed, a situation in which foreign objects such as paper dust and toner attach to the areas between the protruding parts 79 does not occur since no light transmitting member 72 exists in the areas. As a result, an influence of errors on a density detection result of the test image read through the spaces between the protruding parts 79 is reduced. Moreover, the sheet P being transported comes in contact with the protruding parts 79, and is thus less likely to enter the opening 71a. Hence, occurrence of jams of the sheet P attributable to a top end part of the sheet P caught by the opening 71a is suppressed. In addition, the first housing to which the protruding parts 79 are attached may be electrically grounded, in order that the protruding parts 79 may be less likely to electrostatically adsorb foreign objects such as toner and paper dust.

Second Exemplary Embodiment

The second exemplary embodiment is approximately the same as the first exemplary embodiment. However, the length of the protruding parts 72b in the second scan direction Y is different from that in the first exemplary embodiment. Here, the protruding parts 72b are provided in the light transmitting member 72. Along with this difference, a part of the contents in the processing for the reading result of the test image is different from that in the first exemplary embodiment. Note that, in the second exemplary embodiment, the same reference numerals are given to the same components as those in the first exemplary embodiment, and the detailed explanation thereof is omitted here.

FIGS. 16A to 16C are views for explaining a configuration of the light transmitting member 72 provided in the image capturing portion 61. Here, FIG. 16A is a bottom view of the light transmitting member 72 seen from the sheet transport path 55 side in FIG. 2, FIG. 16B is a cross sectional view taken along a line XVIB-XVIB in FIG. 16A, and FIG. 16C is a cross sectional view taken along a line XVIC-XVIC in FIG. 16A. Note that, FIG. 16C shows a cross section at the reading position RP shown in FIG. 2.

In the second exemplary embodiment, multiple protruding parts 72b provided on the lower surface side of the light transmitting member 72 are each formed to extend in the second scan direction Y, as in the case of the first exemplary embodiment. Note that, each of the protruding parts 72b is formed between an area of an end of the light transmitting member 72 on the upstream side in the second scan direction Y and an area on the upstream side of the reading position RP. Accordingly, in the second exemplary embodiment, each of the protruding parts 72b is formed so as not to cross the reading position RP. Thereby, as shown in FIG. 16C, the upper and lower surfaces of the light transmitting member 72 are flat at the reading position RP.

Figure 17A:
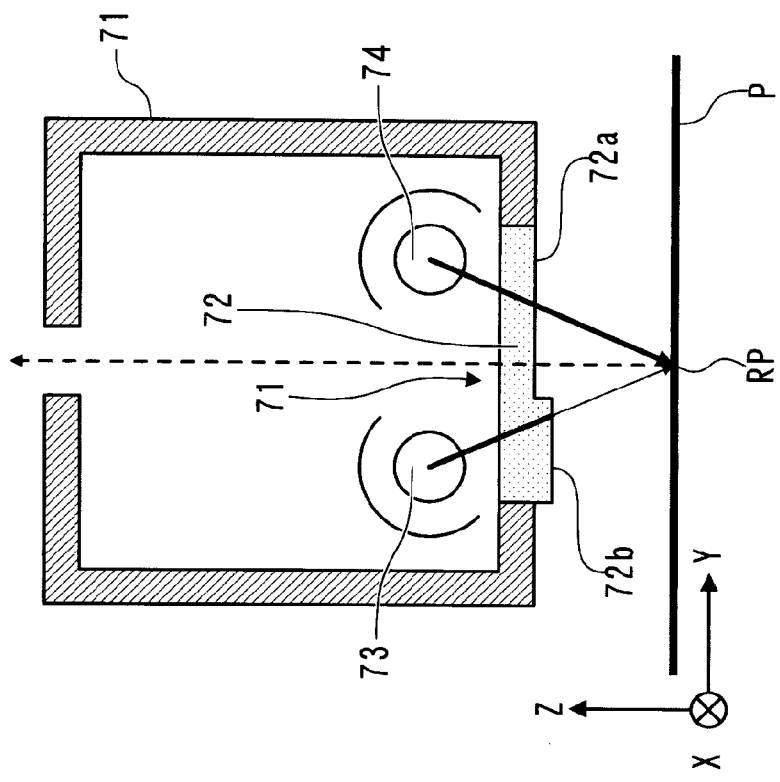
FIGS. 17A and 17B are views for explaining light beams emitted to the reading position and light beams reflected at the reading position in the second exemplary embodiment.
Figure 17B:
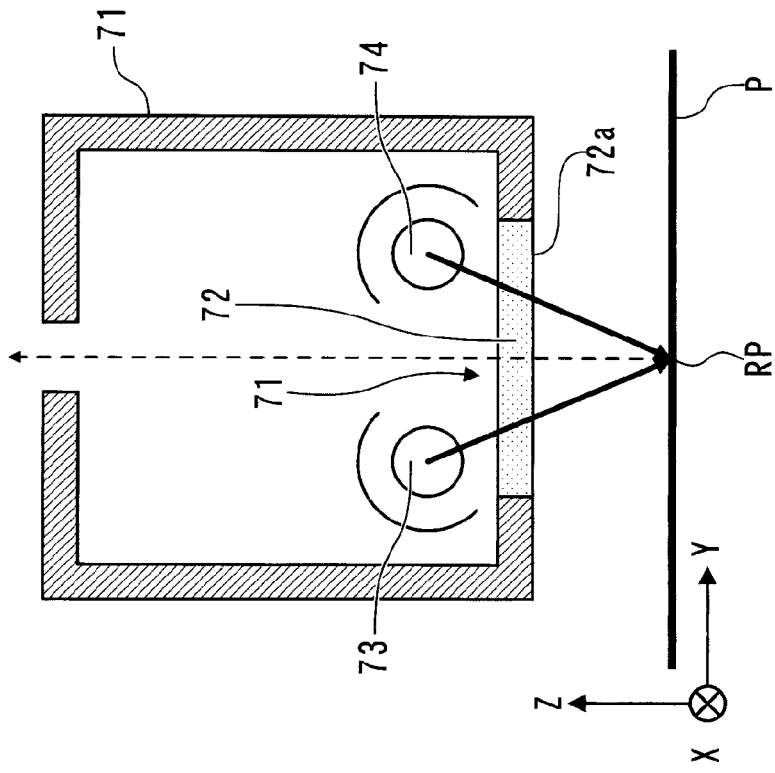

FIGS. 17A and 17B are views for explaining light beams emitted to the reading position RP and light beams reflected at the reading position RP. FIG. 17A is a cross-sectional view of a portion of the light transmitting member 72, where the flat part 72a is formed in the second scan direction Y, and FIG. 17B is a cross sectional view of a portion of the light transmitting member 72, where the protruding parts 72b and the flat part 72a are formed in the second scan direction Y.

As shown in FIG. 17A, the reading position RP is irradiated, through the flat part 72a of the light transmitting member 72, with light beams emitted from the first light source 73 arranged on the upstream side in the second scan direction Y and light beams emitted from the second light source 74 arranged on the downstream side in the second scan direction Y. In addition, some of light beams reflected at the reading position RP are directed to the CCD image sensor 77 (refer to FIG. 2) through the flat part 72a of the light transmitting member 72.

On the other hand, as shown in FIG. 17B, some of light beams emitted from the first light source 73 are scattered by the protruding parts 72b of the light transmitting member 72, and thus the reading position RP is irradiated with light beams having a reduced amount of light. In contrast, the reading position RP is also irradiated, through the flat part 72a of the light transmitting member 72, with the light beams emitted from the second light source 74. Then, some of light beams reflected at the reading position RP are directed to the CCD image sensor 77 (refer to FIG. 2) through the flat part 72a of the light transmitting member 72.

In the above-described first exemplary embodiment, the protruding parts 72b are formed over the entire area of the light transmitting member 72 in the second scan direction. By this configuration, the amount of light emitted from the first light source 73 and the second light source 74 to the reading position RP is reduced at the positions where the protruding parts 72b are formed, and the amount of light reflected at the reading position RP and directed to the CCD image sensor 77 is also reduced.

On the other hand, in the second exemplary embodiment, by adopting the above-mentioned configuration, also at the formation parts of the protruding parts 72b, the sufficient amount of light is secured as compared to the case in the first exemplary embodiment, even though the amount of light emitted to the reading position RP and the amount of light reflected at the reading position RP and directed to the CCD image sensor 77 are reduced as compared to those at the formation parts of the flat parts 72a.

Figure 18:
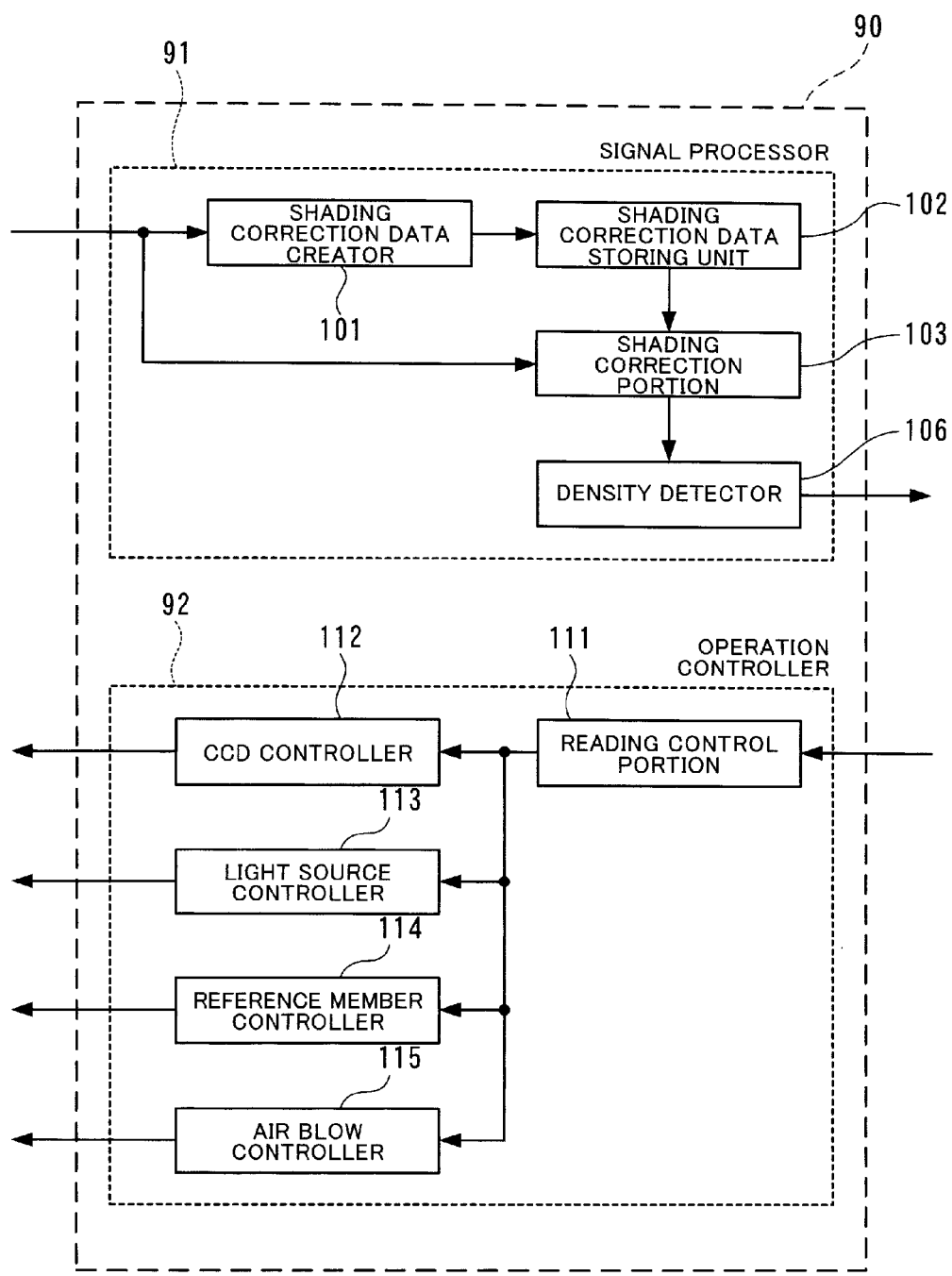
FIG. 18 is a functional block diagram of the reading controller in the second exemplary embodiment.

FIG. 18 is a functional block diagram of the reading controller 90 in the second exemplary embodiment. Note that, the difference from the first exemplary embodiment is the signal processor 91 which is not provided with the protruding part address storing unit 104 and the protruding part address deletion portion 105. In accordance with this difference, the configuration in which the red component image data, green component image data and blue component image data are directly inputted to the density detector 106 is also different from that of the first exemplary embodiment. Here, the red component image data, green component image data and blue component image data are outputted from the shading correction portion 103.

The image forming apparatus of the second exemplary embodiment causes the image formation section 30 to form a test image on the sheet P, causes the image reader 60 to read the test image formed on the sheet P, while the test image is transported, and then performs setting operation for various imaging conditions for adjusting image density of each color and setting operation for various imaging conditions for detecting or adjusting image quality of each color, on the basis of the result of the reading. The image quality described herein refers to, for example, a defect of image quality such as a dot. Here, the imaging conditions to be set for adjusting the image density include image forming conditions in the image formation section 30 (a charging condition, an exposure condition and development condition in each of the image formation units 10Y, 10M, 10C and 10K) and the like, for example. In addition, the imaging conditions to be set for adjusting the image quality include a primary transfer condition, a secondary transfer condition, a fixing condition in the fixing unit 50, and the like.

Next, a process for adjusting the image density and the image quality in the second exemplary embodiment is specifically described. Note that, the structural operation of the image reader 60 executed before the adjustment of the image density is performed by the same procedure as that of the first exemplary embodiment, and thus the description thereof is omitted here.

Figure 19:
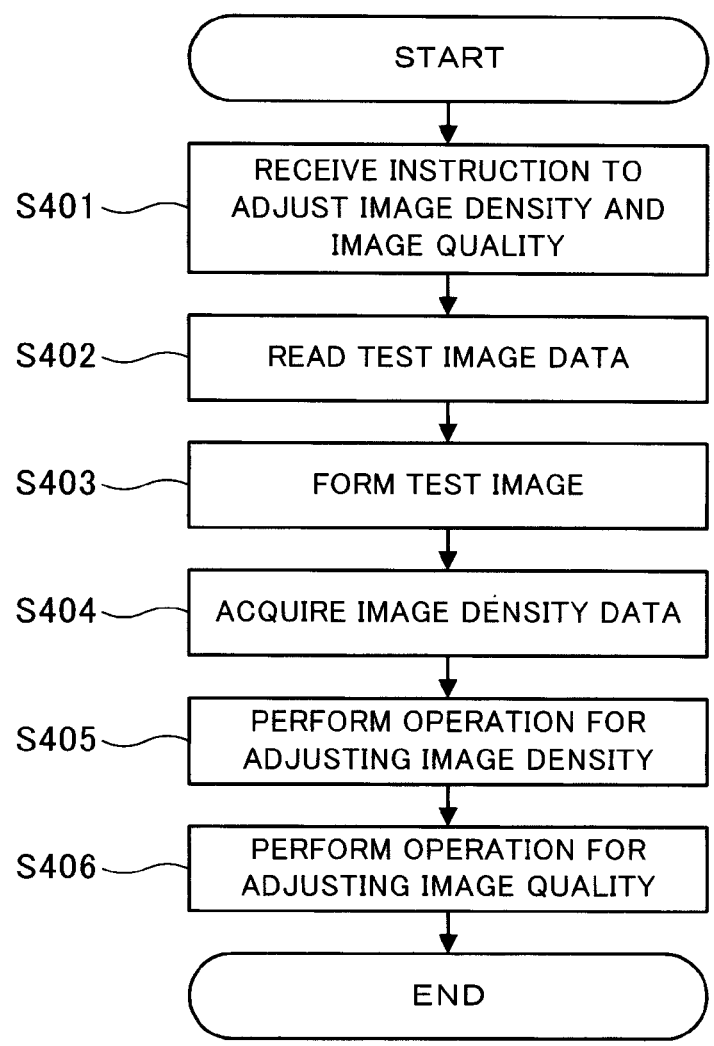
FIG. 19 is a flowchart showing a flow of entire process performed by the image forming apparatus in the operation for adjusting image density and image quality in the second exemplary embodiment.

FIG. 19 is a flowchart showing a flow of entire process performed by the image forming apparatus in the operation for adjusting image density and image quality.

Upon receipt of an instruction to adjust image density and image quality from the user interface or the like not shown in the figure (Step 401), the controller 1 reads test image data stored in the memory not shown in the figure (Step 402), and provides instruction to form a test image on the sheet P on the basis of the read test image data (Step 403). Subsequently, the controller 1 acquires image density data based on a result obtained by causing the image reader 60 to read the fixed test image on the sheet P (Step 404), provides instruction to perform the operation for adjusting image density in each of the image formation units 10Y, 10M, 10C and 10K on the basis of the acquired image density data (Step 405), and then provides instruction to perform the operation for adjusting image quality in which conditions in a primary transfer unit, the secondary transfer unit and the fixing unit 50 are changed (Step 406). Then, the entire process is completed.

Figure 20:
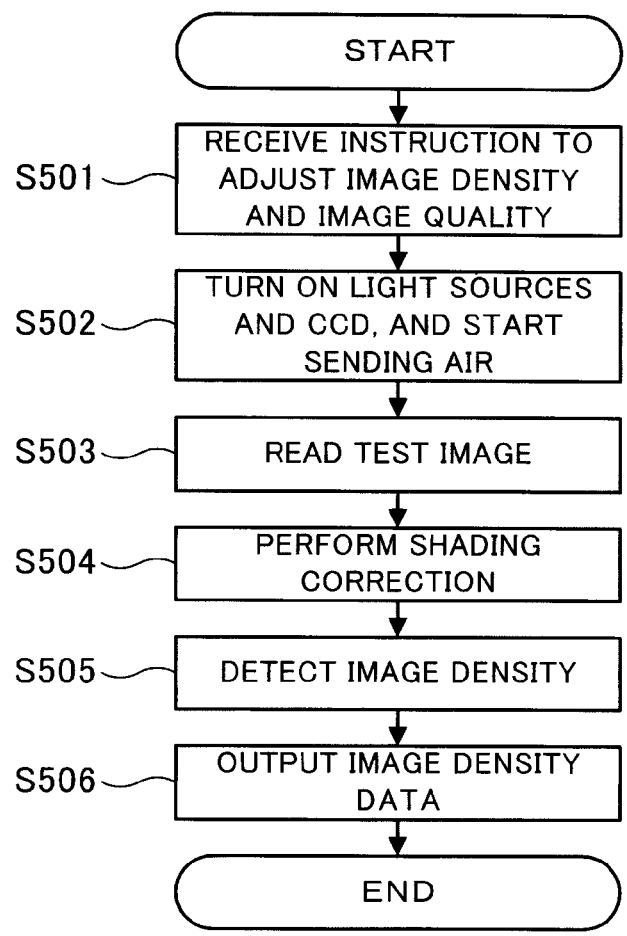
FIG. 20 is a flowchart showing a flow of a process performed by the image reader in the operation for adjusting the image density and the image quality in the second exemplary embodiment.

FIG. 20 is a flowchart showing a flow of a process performed by the image reader 60 in the above-described operation for adjusting the image density and the image quality.

Upon receipt of an instruction to adjust image density and image quality from the controller 1 (Step 501), the reading control portion 111 causes the light source controller 113 to turn on the first light source 73 and the second light source 74, causes the CCD controller 112 to turn on the CCD image sensor 77 (the red pixel array 77R, the green pixel array 77G and the blue pixel array 77B), and also causes the air blower 63 to start sending air (Step 502).

Thereafter, as the sheet P which has passed through the fixing unit 50 and on which the test image is fixed passes through the reading position RP, the CCD image sensor 77 reads the test image formed on the sheet P (Step 503).

During this operation, the sheet P on which the test image is formed passes through the reading position RP while being transported in the second scan direction Y in the sheet transport path 55. At this event, the image formation surface of the sheet P is transported so as not to come in contact with the flat parts 72a corresponding to the reading position RP although coming in contact with the protruding parts 72b provided to the light transmitting member 72 and arranged on the upstream side of the reading position RP in the second scan direction Y in some cases. Accordingly, stains of toner and the like may be attached to the protruding parts 72b due to the contact of the sheet P, but are less likely to be attached to the flat parts 72a corresponding to the reading position RP.

In addition, in the second exemplary embodiment, air is sent to the image formation surface of the sheet P by using the air blower 63 on the upstream side of the reading position RP in the second scan direction Y. Thereby, an airflow in the second scan direction Y occurring between the image formation surface of the sheet P and the light transmitting member 72 operates to separate the image formation surface of the sheet P from the protruding parts 72b provided to the light transmitting member 72. With this configuration, the image formation surface of the sheet P is less likely to come in contact with the protruding parts 72b. Moreover, even when foreign objects such as dust attach to the flat parts 72a and protruding parts 72b, the foreign objects are blown off easily by the air thus sent.

As a result of reading the test image formed on the sheet P in Step 503, red component image data, green component image data, and blue component image data of the test image on the single sheet P are acquired. Then, the red component image data, the green component image data and the blue component image data thus acquired are inputted to the shading correction portion 103. Moreover, the shading correction portion 103 reads, from the shading correction data storing unit 102, red shading correction data, green shading correction data and blue shading correction data.

Then, the shading correction portion 103 performs shading correction on the inputted image data (Step 504). Thereafter, the red component image data, the green component image data and the blue component image data thus subjected to the shading correction are outputted to the density detector 106.

Thereafter, the density detector 106 detects the image density on the basis of the inputted image data (Step 505). Then, the density detector 106 outputs the obtained image density data of the single sheet P to the controller 1 (Step 506), and completes the entire process.

Figure 21A:
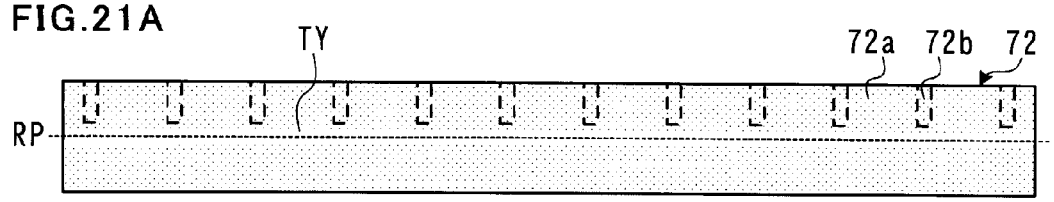
FIGS. 21A to 21C are diagrams for explaining an example of processing performed by the signal processor when the test image is read.
Figure 21B:
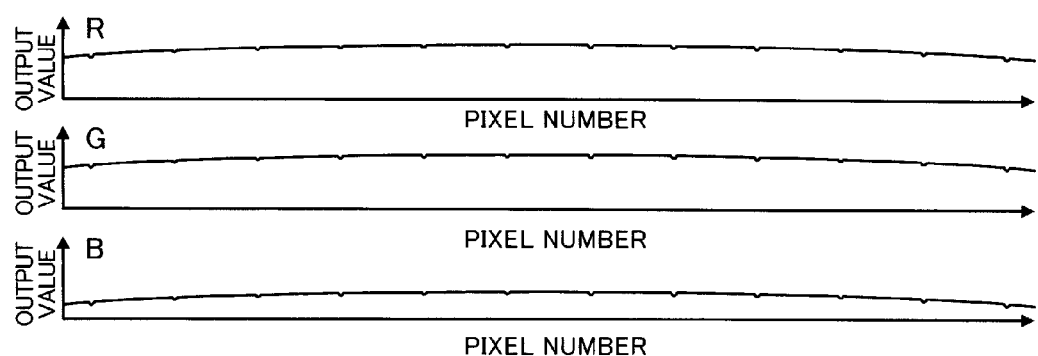
Figure 21C:
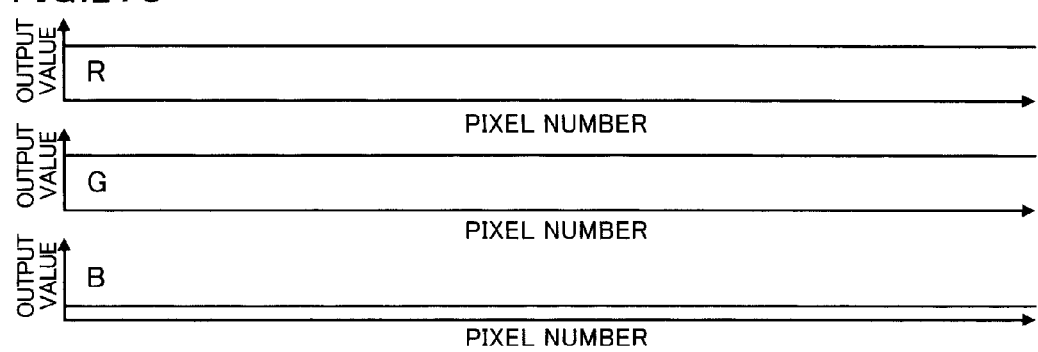

FIGS. 21A to 21C are diagrams for explaining an example of processing performed by the signal processor 91 (see FIG. 18) when the test image shown in FIG. 11 is read. FIG. 21A shows a positional relationship between the light transmitting member 72 and the test image (in this example, a yellow image is exemplified). Moreover, FIG. 21B shows red component image data (R), green component image data (G), and blue component image data (B) for one line in the first scan direction X inputted to the shading correction portion 103 as a result of reading of the images shown in FIG. 21A by the red pixel array 77R, the green pixel array 77G and the blue pixel array 77B. Further, FIG. 21C shows the red component image data (R), the green component image data (G), and the blue component image data (B) for the one line in the first scan direction X after the shading correction, which are outputted from the shading correction portion 103 and inputted to the density detector 106. Note that, in each of FIGS. 21B and 21C, the horizontal axis shows the pixel numbers (1 to K) of the red pixel array 77R, the green pixel array 77G and the blue pixel array 77B, while the vertical axis shows output values at the respective pixel numbers.

As shown in FIG. 21B, the red component image data outputted from the red pixel array 77R, the green component image data outputted from the green pixel array 77G and the blue component image data outputted from the blue pixel array 77B each include error components attributable to, for example, unevenness of light amount from the first light source 73 and the second light source 74 and unevenness of sensitivity of each photodiode PD constituting the pixel array of the corresponding color. In addition, the image data of each of the color components includes both output values from parts receiving light beams passing through the flat parts 72a of the light transmitting member 72 and output values of parts receiving light beams passing through the protruding parts 72b of the light transmitting member 72. Here, the amount of light received after passing through each of the protruding parts 72b tends to be smaller than that received after passing through each of the flat parts 72a. This is considered to result from reduction in the amount of light transmitted toward the CCD image sensor 77 after passing through the protruding parts 72b, due to the shape of the protruding parts 72b. In the second exemplary embodiment, since the protruding parts 72b are formed respectively at twelve parts in the first scan direction X, the number of parts having a locally reduced light amount is also twelve. Note that, the amount of light is less reduced at the parts where the light is locally reduced in comparison with the case in the first exemplary embodiment, because of the reason explained with FIG. 17.

By the shading correction performed by the shading correction portion 103, error components attributable to, for example, in the unevenness of light amount from the first light source 73 and the second light source 74 and the unevenness of sensitivity of each photodiode PD constituting the pixel array of the corresponding color are removed from each of the red component image data, the green component image data and the blue component image data as shown in FIG. 21C. Here, also in the areas corresponding to the formation parts of the protruding parts 72b, error is reduced since the larger amount of light is sufficiently obtained at the areas in comparison with the case in the first exemplary embodiment.

Accordingly, in the second exemplary embodiment, the image density may be detected without deletion of image data corresponding to the protruding part addresses unlike in the first exemplary embodiment. Thus, in the second exemplary embodiment, the image density for one line in the first scan direction may be detected. Therefore, in the second exemplary embodiment, in addition to the adjustment of the image density, detection of a defect of the image quality or adjustment of the image quality against the defect of the image quality may be performed by the controller 1 provided in the main body of the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a recording medium; and
   an image reading device that reads the image formed on the recording medium by the image forming unit, the image reading device including:
      a reading unit that includes a light source emitting light to irradiate the image on the recording medium transported in a first direction and a light receiving portion that receives light reflected by the recording medium;
      a transport path forming unit that forms a part of a transport path for the recording medium;
      a light transmitting portion that is provided in the transport path forming unit and transmits the light; and
      a plurality of projection members that are provided to the light transmitting portion so as to project from the light transmitting portion toward the transport path, and that are arranged in a second direction crossing the first direction while each extending in the first direction;
   wherein, when an image forming condition of the image forming unit is adjusted on the basis of a result obtained by, after forming a test image on the recording medium by the image forming unit, reading the test image formed on the recording medium by the image reading device, the image forming unit forms the test image on a part of the recording medium, the part not including facing parts of the recording medium that respectively face the plurality of projection members.

2. The image forming apparatus according to claim 1, further comprising a deletion unit that deletes data corresponding to formation parts of the plurality of projection members, from image data acquired by reading the image on the recording medium by the image reading device.

3. The image forming apparatus according to claim 1, wherein at least one of the plurality of projection members is provided along the second direction within a reading area read by the reading unit.

4. The image forming apparatus according to claim 1, wherein the plurality of projection members are made of a conductive material and are electrically grounded.

5. The image forming apparatus according to claim 1, further comprising an air blowing unit that sends air from an upstream side of the light transmitting portion in the first direction to the light transmitting portion through the transport path.

6. The image forming apparatus according to claim 1, wherein the light transmitting portion is formed of a light transmitting member that transmits light and that is fitted into an opening portion included in the transport path forming unit.

7. The image forming apparatus according to claim 6, wherein the plurality of projection members are each provided along the first direction to cross a reading area read by the reading unit.

8. The image forming apparatus according to claim 6, wherein the plurality of projection members are each provided along the first direction not to cross a reading area read by the reading unit.

9. The image forming apparatus according to claim 8, wherein the plurality of projection members are provided along the first direction on an upstream side of the reading area read by the reading unit in the first direction.

* * * * *